(12) United States Patent
Dasch et al.

(10) Patent No.: US 8,875,097 B2
(45) Date of Patent: Oct. 28, 2014

(54) SUBSYSTEM ARCHITECTURE FOR PROVIDING SUPPORT SERVICES FOR SOFTWARE APPLICATIONS

(75) Inventors: Thomas Dasch, Nürnberg (DE); Lutz Dominick, Eggolsheim (DE); Karlheinz Dorn, Kalchreuth (DE); Ivan Murphy, Baiersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 1612 days.

(21) Appl. No.: 12/010,483

(22) Filed: Jan. 25, 2008

(65) Prior Publication Data

US 2009/0193394 A1 Jul. 30, 2009

(51) Int. Cl.
*G06F 9/44* (2006.01)

(52) U.S. Cl.
CPC ............... *G06F 9/4428* (2013.01); *G06F 8/70* (2013.01)
USPC ...................................................... 717/120

(58) Field of Classification Search
CPC ............... G06F 8/20; G06F 8/36; G06F 8/71; G06F 9/44505; G06Q 10/10
USPC ...................................................... 717/120
See application file for complete search history.

(56) References Cited

U.S. PATENT DOCUMENTS

| | | | | |
|---|---|---|---|---|
| 6,134,594 A | * | 10/2000 | Helland et al. | 709/229 |
| 6,205,466 B1 | * | 3/2001 | Karp et al. | 718/104 |
| 7,240,109 B2 | * | 7/2007 | Wookey et al. | 709/223 |
| 7,437,408 B2 | * | 10/2008 | Schwartz et al. | 709/204 |
| 2002/0188674 A1 | * | 12/2002 | Brown et al. | 709/203 |
| 2003/0126136 A1 | * | 7/2003 | Omoigui | 707/10 |
| 2003/0229278 A1 | * | 12/2003 | Sinha | 600/407 |
| 2004/0003083 A1 | * | 1/2004 | Wookey et al. | 709/225 |
| 2004/0010796 A1 | * | 1/2004 | Paul et al. | 719/328 |
| 2004/0111639 A1 | * | 6/2004 | Schwartz et al. | 713/201 |
| 2004/0148184 A1 | * | 7/2004 | Sadiq | 705/1 |
| 2004/0268188 A1 | * | 12/2004 | Kirkpatrick et al. | 714/45 |
| 2005/0071818 A1 | * | 3/2005 | Reissman et al. | 717/127 |
| 2006/0150200 A1 | * | 7/2006 | Cohen et al. | 719/328 |
| 2008/0052729 A1 | * | 2/2008 | Paul et al. | 719/328 |
| 2008/0082966 A1 | * | 4/2008 | Dorn et al. | 717/120 |
| 2008/0127137 A1 | * | 5/2008 | Becker et al. | 717/140 |

* cited by examiner

*Primary Examiner* — Qing Chen
*Assistant Examiner* — Andrew M Lyons
(74) *Attorney, Agent, or Firm* — Harness, Dickey & Pierce

(57) ABSTRACT

A subsystem architecture is described that provides support services for software applications of a system. The subsystem architecture includes local infrastructure components, which provide infrastructure services to the software applications. Each local infrastructure component corresponds to a single software application and is independent from another of the local infrastructure components. The subsystem architecture may further include a central service component providing central services to at least one of the local infrastructure components. The central service component is independent and unaware of the local infrastructure components. Still further, the subsystem architecture may include an administrative component for monitoring and maintaining the local infrastructure components providing infrastructure services to the software applications. The administrative component is independent and unaware of the plurality of local infrastructure components.

20 Claims, 25 Drawing Sheets

SUBSYSTEM ARCHITECTURE FOR PROVIDING SUPPORT SERVICES FOR SOFTWARE APPLICATIONS

BACKGROUND

1. Field of the Invention

Example embodiments relate to subsystem architecture for providing support services for software applications such as medical and financial applications.

2. Description of the Related Art

Generally, software applications used by various businesses and/or institutions may require and/or benefit from an infrastructure providing various information technology (IT) services such as logging, auditing, utilization, installation, software distribution, licensing, security, online help, configuration, monitoring, diagnostics, life cycle management, tracing, session management and context management. Conventional solutions for providing this infrastructure and/or the above mentioned IT services involve collecting a set of the required or requested IT services for each of the various different applications involved in a system or being run by a business and/or institution. However, the IT services for the various different applications are generally not related to each other and/or consistent from one software application to another software application, which may be used by the common business and/or institution.

The different IT services may be provided by or produced from different third party vendors and may be implemented "straight out of the box," i.e., the service is not customized or adjusted for the specific software application using the service. As such, there is not a homogenous and systematic deployment of an infrastructure providing IT services in the above-described conventional solution. At least in part because there is not a systematic approach or pattern for providing services to the different software applications, the management and monitoring of the infrastructure and related services are not easily provided.

Further, providing different IT services created by different third party vendors, which may be implemented straight out of the box may also cause other detrimental effects. In particular, the specific operations of an IT service provided straight out of the box is not always known. Accordingly, the coupling between the IT service and the serviced software application has an effect on the service and may also have an effect on one or more other software applications communicating with the serviced application. Stated differently, the straight out of the box IT service may indirectly couple the serviced software application with one or more other software applications communicating with the serviced application.

One conventional approach attempting to address some of the above issues is to provide a single product or software application that superimposes a homogeneous solution on top of all of the various different software applications requiring or requesting IT services. In particular, a common product will be used to manage all of the services required by the different software applications. Unfortunately, this solution essentially moves the integration point of the various different applications having a common set of required IT services into the various different software applications. However, the various different software applications generally have different purposes and the inclusion of this common product may detrimentally affect the performance of the various different software applications. Further, because a homogenous solution is integrated into all of the various different software applications, the applications are now dependent on monolithic middleware, which may hamper the various different software applications. For example, the various different software applications may have different product life-cycles and thus, the homogeneous solution may not take into account the different life-cycles of the different software applications.

As described above, conventional solutions for providing various IT services may have a detrimental effect on the performance of the software applications of a business and/or institution. Further, the conventional solutions may have a detrimental effect on the technical coupling between the software applications of a business and/or institution.

SUMMARY

Example embodiments provide a homogenous and systematic approach for providing IT services to software applications being run by a medical and/or financial institution.

An example embodiment provides a subsystem architecture for providing support services for software applications of a system. The subsystem architecture includes a plurality of local infrastructure components for providing infrastructure services to the software applications. Each local infrastructure component corresponds to a single software application and is independent from another of the plurality of local infrastructure components.

According to an example embodiment, each local infrastructure component provides a single service tailored for the corresponding software application.

According to an example embodiment, a service provided by a local infrastructure component includes one of logging, licensing, auditing, tracing, session management, context management, security, utilization, installation, system diagnostics, online help, configuration, local monitoring, lifecycle management, and software distribution services.

According to an example embodiment, each local infrastructure component communicates with a corresponding software application via a contract using a programming language interface. The programming interface is not a remote interface.

According to an example embodiment, the subsystem architecture further includes a central service component that provides central services to one or more of the plurality of local infrastructure components. The central service component is independent and unaware of the plurality of local infrastructure components.

According to an example embodiment, the central services provided by a central service component relate to one or more of an active directory application mode, session management, license management, system status monitoring, message storage, central auditing, central utilization, central logging, authorization management, authentication management, online help repository, managed node package, and asset management.

According to an example embodiment, the central service component communicates with the one or more of the local infrastructure components via a second contract using a web service or any other remote interface.

According to an example embodiment, a service provided by the one or more local infrastructure components includes an online and offline mode. During the offline mode, information related to the service is stored in a local infrastructure component. During the online mode, information related to the service is stored in the central service component.

According to an example embodiment, a local infrastructure component determines the significance and/or severity of information received from a corresponding software application, and the determined significance and/or severity directs processing of the information. If the severity of information is determined to be high, the information is stored in one of the local infrastructure components, as well as the central service component. If the severity of information is determined to be low, the information is only stored in a local infrastructure components.

According to an example embodiment, the subsystem architecture further includes an administrative component for at least one of monitoring and maintaining the local infrastructure components providing infrastructure services to the software applications or the central component providing central services available to the local infrastructure components. The administrative component is independent and unaware of the local infrastructure components and the central service component.

According to an example embodiment, the administrative component receives input from a user, queries an appropriate data repository, receives information based on the query, and displays the queried information.

According to the example embodiment are one or more of two dimensional/three dimensional/four dimensional viewing applications for medical scanner devices, patient health monitoring applications, angiographic life monitoring applications, patient registration applications, information systems applications for a hospital department, laboratory, and patient archiving and viewing applications.

BRIEF DESCRIPTION OF THE DRAWINGS

The above and other aspects and advantages of the present invention will become more apparent by describing in detail example embodiments thereof with reference to the attached drawings in which.

DETAILED DESCRIPTION OF EXAMPLE EMBODIMENTS

Various example embodiments are now described more fully with reference to the accompanying drawings in which some example embodiments of the invention are shown. However, specific structural and functional details disclosed herein are merely representative for purposes of describing example embodiments, and one skilled in the art will appreciate that example embodiments may be embodied in many alternate forms and should not be construed as limited to only the embodiments set forth herein.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of this disclosure.

It will be understood that when a component is referred to as being "connected" or "coupled" to another component, it can be directly connected or coupled to the other component or intervening components may be present. In contrast, when a component is referred to as being "directly connected" or "directly coupled" to another component, there are no intervening components present. Other words used to describe the relationship between components should be interpreted in a similar manner (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising," "includes" and/or "including", when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, unless the context clearly indicates otherwise.

Various example embodiments are described in detail below with reference to the attached drawings.

Figure 1:
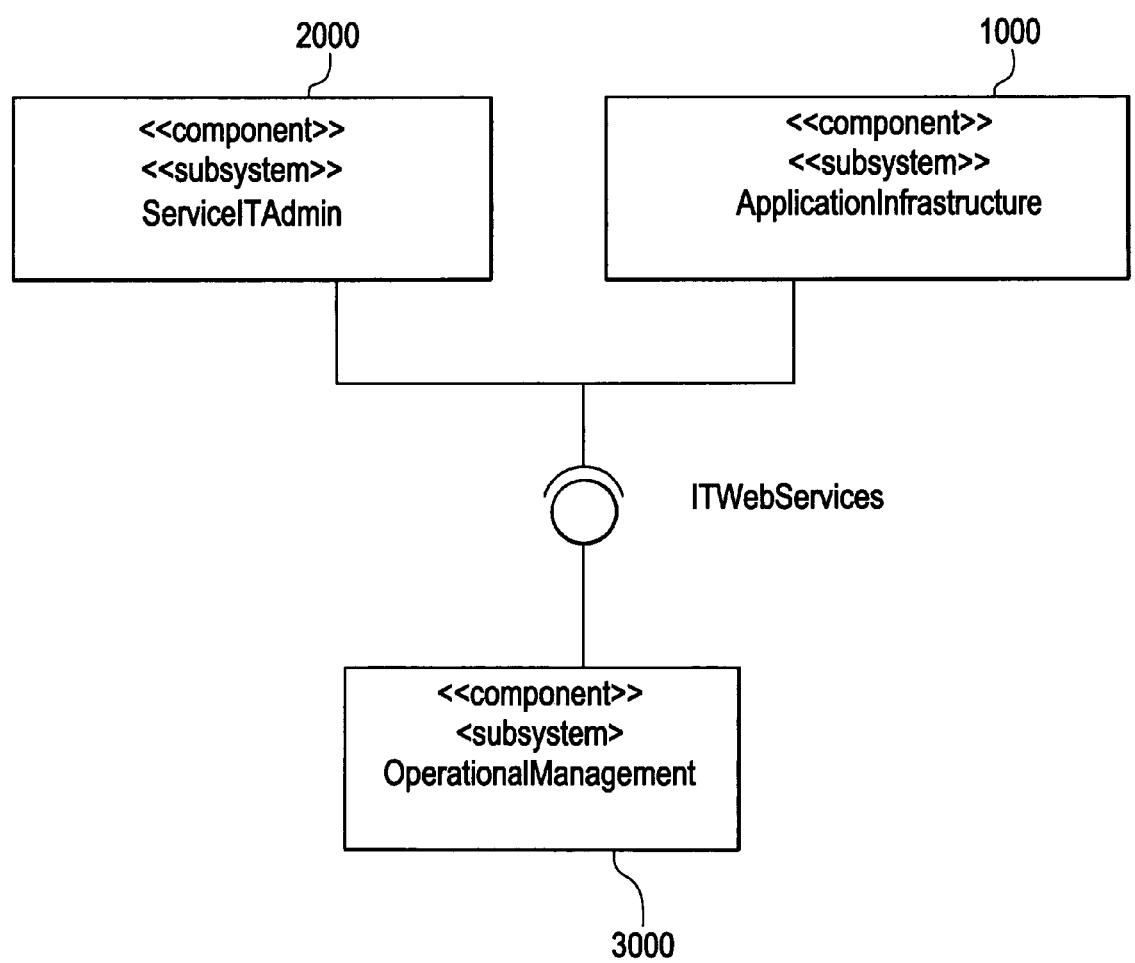
FIG. 1 illustrates an example embodiment of subsystem architecture for providing support services for software applications.

An example embodiment of subsystem architecture for providing support services for software applications is illustrated in FIG. 1. Example software applications used in a medical institution include two dimensional (2D), three dimensional (3D) or four dimensional (4D) viewing applications for medical scanner devices such as CT, MR, Ultrasound, nuclear, etc.; patient health monitoring applications of an intensive care department; angiographic life monitoring applications; patient registration applications; information systems applications for hospital departments; radiology and cardiology laboratories, patient archiving and viewing applications. The subsystem architecture includes local application infrastructure component 1000, a service IT administration component 2000, and a central operation management component 3000.

Local Application Infrastructure Component 1000 and Related Services

The local application infrastructure component 1000 provides a variety of local services directly connected and tailored to the various different local software applications. For example, the local application infrastructure component 1000 may provide services relating to one or more of configuration, logging, licensing, auditing, tracing, session management, context management, security, utilization, installation, system diagnostics, online help, life cycle management, software distribution, and local monitoring. Hereinafter, each of the local services may be referred to as an infrastructure service "IS". A brief description of these different services are provided below.

Configuration IS handles configuration data for a software application, tool kits and services. Configuration data may be stored in local files and/or a central configuration repository based on a statement defined in the configuration IS. An example central configuration repository is implemented using a MICROSOFT ADAM™.

Logging IS handles logging of messages for a software application, tool kits and services. Log messages can be stored in local files and/or central message repository via a web service or any other remote communication system. The storage location of the log messages depends on a strategy of the logging IS.

Licensing IS provides license management to application business logic and services. Licenses can be available locally or from a central license node via web service access.

Auditing IS allows writing audit messages to the audit repository from application business logic. The audit messages can be stored locally e.g., in a file, or in a central audit message repository. The storage location of the audit messages is based on a strategy of the auditing IS.

Tracing IS stores messages via trace mechanisms from the applications, tool kits and services in local files. Tracing is generally used for debugging and/or development purposes only.

Session management IS allows creating and propagating sessions and user information globally among software applications for each user. Context management IS offers Clinical Contacts Object Workgroup (CCOW) integration.

Security IS allows role based user access to the system and user management information using MICROSOFT ACTIVE DIRECTORY™, for example, as well as locally. MICROSOFT AZMAN™, for example, may be used to store roles and rights for users and implemented as a component of the Security IS.

Utilization IS collects information about usage statistics, as well as, staff performance. For example, the usage statistics may provide information indicating what staff members and users are using various software applications.

Installation IS is a collection of tools and applications, which may be used to install software on a machine. The tools and applications of the installation IS may be related to a first time installation, as well as, updates or upgrades of software at a later date.

System diagnostics IS allows a clinical user and/or administrators to inspect system behavior and to match this behavior with reference values. The system diagnostics IS may log the results of the inspection of system behavior for further processing.

Online help IS provides user assistance with context sensitive help information on a user interface level.

Life-cycle management IS allows managing the life-cycles of the software programs. The life-cycles refer to start, restart and shutdown of the software applications. For example, the life-cycle management IS can include information for three different programs of a software application, which must be launched in a specific order e.g., a first program, then a second program, and lastly a third program. In this example, if the second program crashes, the life-cycle management IS stops the third program, determines the first program is still running, and accordingly, will start the second program followed by the third program.

Central Operational Management Component 3000 and Related Services

The central operational management component 3000 provides central services available to local application infrastructure components 1000. For example, central operational management component 3000 may provide central services using and/or relating to one or more of an active directory application mode, central session management, license management, system status monitoring, message storage, central auditing, central utilization, central logging, authorization management, authentication management, online help repository, managed node package, and asset management.

An example central service relating configuration may involve an active directory application mode (ADAM) relating to user management and authentication relating to a user login. This central service may use a central ADAM to store (selected) configuration data of the multiple local ADAMs associated with the local services being provided by the local application infrastructure 1000 to the software applications being run by a medical and/or financial institution.

A central session management service may be used to create and handle global sessions used by multiple software applications of the medical and/or financial institutions, for example.

A central license management service handles license management and can be queried for licenses by other components of the system. An example of a central license manager provided by the central operational management component 3000 may be implemented based on a FLEXLM™ license manager product.

A system status monitoring central service implements all web services for system status monitoring and supervision purposes, and may use a central status repository. The system status monitoring service offers web services for administrative user interfaces and monitoring event reception and outgoing commands. Optionally, the system status monitoring service may provide rules for various different plug-ins.

A local monitoring central service is an example of a component adapter for system status monitoring that can perform local monitoring and submits these monitoring messages to the central monitoring service.

A central message storage service may store messages such as, errors, warnings, debug messages, audit messages, etc. in a central database. An example of a central database is an ORACLE DB™.

A central audit service offers central storage of audit messages, which may be received from a local application infrastructure component via a web service.

A central utilization service offers a web service utilization message for central storage for utilization messages, which may be received from a local application infrastructure component 1000 via a web service.

A central log service offers central storage of log messages and may also provide log messages to administrative user interfaces. Log messages are communicated to and from a central log service via one or more web services.

A central authorization management service may store roles and rights for different users. The central authorization management service may be implemented using the MICROSOFT AZMAN™, for example.

An active directory central service may be implemented using the MICROSOFT X.500™ directory implementation for Windows.

A central online help service provides a website with context sensitive online help to a user. The central online help service may be implemented using a solution from T3-MEDIEN™.

A managed node package (MNP) service may include an MNP depot that stores software that can be installed within the network. The MNP is a set of third party agents, such as distribution installations provided by MEDCO™, (like logging, event-handling and installation) and may be maintained from a remote service department.

An asset management central service collects information about installed software and hardware on selected nodes and transfers this information to the service center.

Service IT Administration Component 2000

The service IT administration component 2000 includes applications using central services directly in a manner similar to how the local application infrastructure component 1000 may use central services. However, the service IT administration component 2000 uses the central services with a different intention. While the local application infrastructure component 1000 and the central operational management component 3000 provide services to a software application being used by a medical and/or financial institution, the service IT administration component 2000 does not provide specific services for the software applications and/or used by the local application infrastructure component 1000. Instead, the service IT administration component 2000 includes applications allowing for exploration of data repositories, monitoring, and maintenance of the subsystem architecture, for example.

According to example embodiments, none of the three components of the subsystems architecture are aware of the other two components. For example, the local application infrastructure component 1000 is not aware of either the central operational management component 3000 or the service IT administration component 2000. As a result of the local application infrastructure 1000, the service IT administration component 2000 and the operational management component 3000 being independent and unaware of each other, the danger of creating a monolithic approach to services provided to various different software applications of a medical and/or financial institution is mediated. Accordingly, various IT services can be exchanged and extended and versioning may be independently addressed for each of the different software applications of the medical and/or financial institution. Further, the subsystem architecture allows third-party products to be introduced at any time, independently of other local and central services being available for the various different software applications by the local application infrastructure 1000.

Still referring to FIG. 1, the local application infrastructure component 1000 may operate as a stand alone infrastructure. Accordingly, both the central operational management component 3000 and the service IT administration component 2000 are optional. However, if the operation management component 3000 is provided, the application infrastructure component 1000 may access the operational management component 3000 with a configurable local plug-in that uses a standardized remote interface such as a web service. The configurable local plug-in may address compatibility issues and allow the various different services to be provided by different third party vendors. Further, the configurable local plug-in allows central services provided by the operation management component 3000 to communicate with the application infrastructure component 1000 providing local services. As such, a software application being used by a medical and/or financial institution may have an offline mode and an online mode. In an offline mode, only a local service is available to the application infrastructure component 1000, i.e., a central service provided by a central operation management component 3000 is not provided and/or is unavailable to the application infrastructure component 1000 servicing the software application. In an online mode both the local service provided by the application infrastructure is available to the software application and central services provided by the operational management component 3000 are available to the local application infrastructure component 1000 providing a local service to the software application.

Further, if both the central operational management component 3000 and the service IT administration component 2000 are provided, the service IT administration component 2000 may communicate with both the application infrastructure component 1000 and the central operational management component 3000 during administrative activities such as exploration of data repositories, monitoring, and maintenance of the subsystem architecture.

According to an example embodiment, all services, local and central, are maintained independent of each other, connecting only remotely via an interface such as a web service. An interface is an implementation of a contract. In an example in which both the local application infrastructure component 1000 and the operational management component 3000 are included in the subsystem architecture, at least two different contracts are involved.

A first contract is an interface between a software application being used by a medical and/or financial institution and the local application infrastructure component 1000 providing an IT service to the software application. The first contract generally is in the form of simple programming interfaces such as an application programming interface (API) that functions to provide communications between the local application infrastructure component 1000 and the software application. APIs are well-known in the art and thus, the specifics of an API are not discussed herein for the sake of brevity. Further, the simple programming interfaces and/or an API may be tailored specifically for the needs of the serviced software application. There is no remote access involved in the first contract.

A second contract is an interface between the local application infrastructure component 1000 and the operational management component 3000. This second contract provides communications between the local application infrastructure component 1000 and the central operational management component 3000. The second contract is different from the first contract in that the second contract involves the use of a web service or a remote connection.

Having the two different contracts according to an example embodiment allows a first contract to be stable, while a second contract is adjusted. Stated differently, the second contract may be configured without affecting the first contract. This avoids having to recompile a first contract, which would affect the close coupling between a service software application and the local application infrastructure component 1000, when a contract between a local application infrastructure component 2000 and an operational management component 3000 is adjusted or reconfigured.

In the above described example, the local application infrastructure component 1000 acts as a bridge between the first contract, which connects the software application with the local application infrastructure component 1000, and the second contract, which connects the local application infrastructure component 1000 and the central operational management component 3000.

Example services of the subsystem architecture for providing support services for software applications as shown in FIG. 1 are now detailed below.

Figure 2:
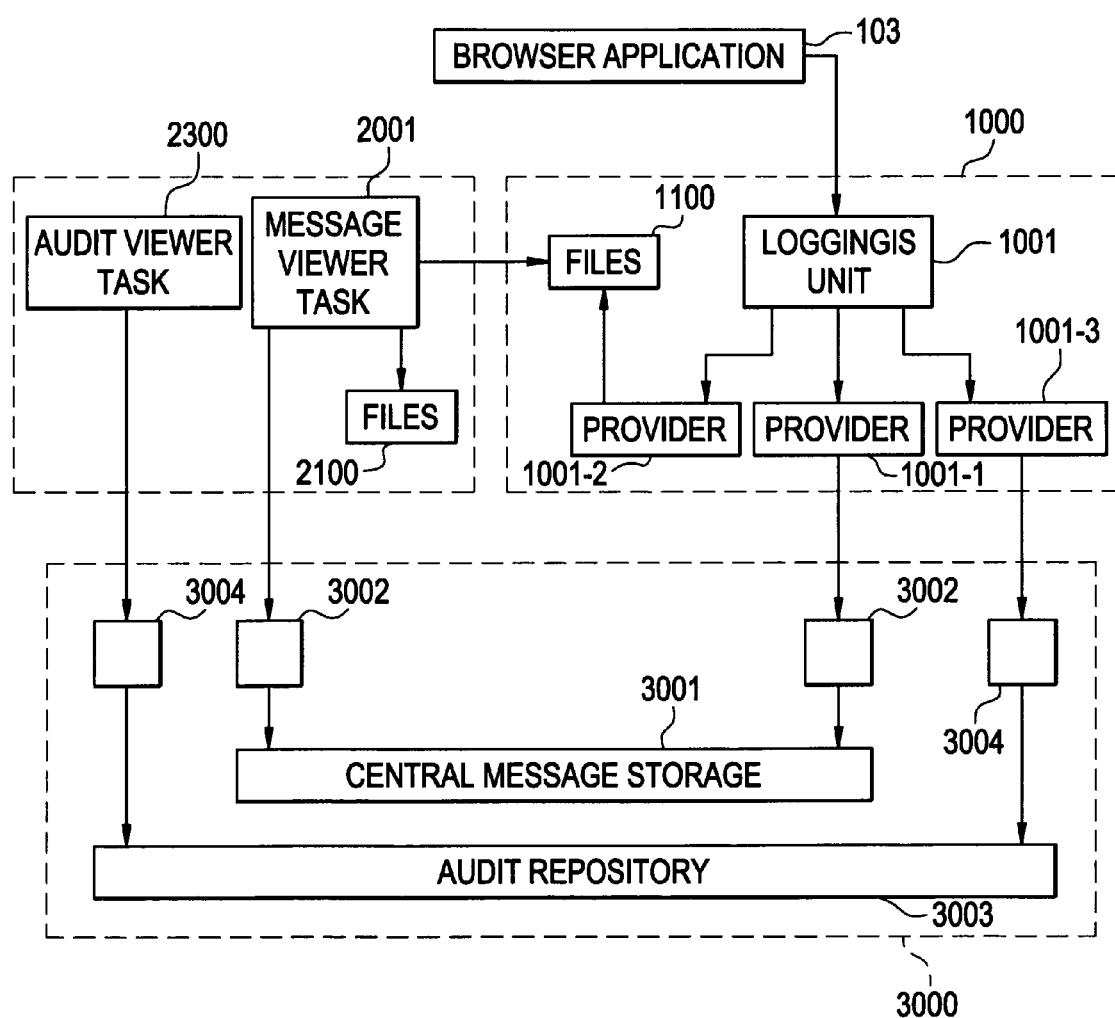
FIG. 2 illustrates a more detailed example configuration of the subsystem architecture of FIG. 1.

FIG. 2 is an example embodiment of a subsystem architecture relating to a software application. As shown in FIG. 2, the specific software application being used by a medical and/or financial institution is a browser application including business logic 103. This browser application 103 is a clinical software application. For example, the browser application 103 may be used to browse work items including data and images. The data and images may be organized by patient, imaging device, etc. For example, the browser application may be used to browse CT images a patient's heart and CT images of a patient's lungs. The work items and review of the work items using the browser application 103 may be used by a physician or technician to begin a workflow relating to diagnosis and treatment of a patient.

The browser application 103 in the example embodiment of FIG. 2 receives local services from the local application infrastructure component 1000, and central services of the central operational management component 3000 are available to the local application infrastructure component 1000. In addition, the service IT administration component 2000 shown in FIG. 2 allows IT administrators to explore data repositories, monitor, and maintain the subsystem architecture relating to the browser application 103, for example.

Referring to FIG. 2, the local application infrastructure component 1000 includes a logging IS unit 1001, three providers 1001-1, 1001-2 and 1001-3, and local file storage 1100. The service IT administration component 2000 shown in FIG. 2 includes an audit viewer task 2003, a message viewer task 2001, and file storage 2100. The central operational management component 3000 of FIG. 2 includes a central message storage unit 3001, a central log RSC 3002, an audit repository 3003 and a central audit RSC 3004. The central log RSC 3002 and central audit RSC 3004 are web services allowing each of the local application infrastructure component 1000 and the service IT administration component to communicate with the central message storage unit 3001 and the audit repository 3003 of the operational management component 3000.

Six different examples of operations performed by the example embodiment of the subsystem architecture and communications between various components of the sub-system architecture are described below.

In a first example, the browser application 103 detects an error message and logs the error message in the central message storage unit 3001. In particular, the business logic of the browser application 103 detects an error. For example, an error is detected by the browser application 103 if no data is available for a patient or if a database is unavailable. The specific detection of errors by a software application is well-known in the art and thus, is not discussed herein for the sake of brevity. Once the error is detected by the browser application 103, the browser application 103 communicates with the logging IS unit 1001. For example, the browser application 103 may communicate with the logging IS unit according to a first contract which provides communication between the browser application and the logging IS via a simple programming interface or API.

A strategy relating to the processing of an error detected by the browser application 103 by the logging service is determined and/or defined by the logging IS unit 1001. For example, the logging IS unit 1001 may be configured to assign a significance and/or severity to an error message received from the browser application 103. An error indicating data for a patient is unavailable may be assigned a low severity flag, for example, because this error is likely common and may simply indicate that test results for a patient is not yet available or a CT image of an organ of the patient has not been obtained. Further, an error indicating a database is unavailable is assigned a high severity flag, for example, because this error can indicate that an entire patient record database or imaging database is down, and that administrative action is required. According to an example strategy that can be implement by the logging IS unit 1001, if an error is assigned a high severity flag, the error message is recorded both locally and centrally, whereas an error assigned a low severity flag may only be stored locally.

As mentioned above, in the first example, the logging IS component 1001 is configured to log the error message in a central message storage unit 3001. As such, the logging IS unit 1001 formats the error message for storage in the central message storage unit 3001 and communicates the appropriately formatted message to a first provider unit 1001-1. The formatted message may include a source ID, text ID, time stamp, etc. In response to a received error message, the provider 1001-1 establishes communication with the central log RSC 3002. The error message is then submitted by the central log RSC 3002 to the central message storage unit 3001 as a web service call with the error message as content. The central message storage unit 3001 receives the web service call and stores the message in a database.

In a second example, the browser application detects an error message and logs the error message locally in the local files 1100 based on the strategy implemented by the logging IS unit 1001. An example significance and/or severity strategy was described above in the description of the first example. However, another example strategy implemented by the logging IS unit 1001 may include an online and offline mode. One skilled in the art will appreciate that the example strategy described below may be used in conjunction with the previously described strategy or other strategies not specifically disclosed herein. In an example online/offline mode strategy, the logging IS unit 1001 may be configured to detect whether a central message storage unit 3001 is available to store files such as in an online mode, or if the central message storage unit 3001 is unavailable to store files such as in an offline mode.

Accordingly, this second example corresponds to a situation in which the logging IS unit 1001 determines the central message storage unit 3001 is unavailable. The logging IS unit 1001 formats the error message received from the browser application 103 into the proper format for storing the error message in local storage unit 1100. The properly formatted message is then communicated to the provider 1001-2. The second provider 1001-2 attempts to access the local storage unit 1100 and if access is granted, the provider provides the properly formatted error message is stored in the local storage files 1100.

In a third example, the browser application needs to write an audit message related to the browser application 103. The audit message may indicate a particular clinical user has accepted or claimed a work item. For example, a radiologist may claim a patient X-ray in order to generate a report. The audit message is recorded in order to let other users know the X-ray has been claimed. In this example, the browser application 103 collects audit message data and communicates the audit message data to the logging IS unit 1001 via an audit interface. The logging IS unit 1001 is always configured to store audit messages in an audit repository 3003 of the central operational management component 3000. Accordingly, the logging IS unit 1001 formats the audit message for the audit repository unit 3003. Once the audit message is properly formatted by the logging IS unit 1001, the logging IS unit 1001 provides the properly formatted audit message to the provider 1001-3. The provider 1001-3 then attempts to access the audit repository unit 3003 via a web service illustrated in FIG. 2 as the central audit RSC 3004. The central audit RSC 3004 communicates the audit message to the audit repository 3003 as a web service call with the properly formatted audit message content. The audit repository unit 3003 stores the received message into a database.

In a fourth example, the message viewer task unit 2001 of the service IT administration component 2000 displays an available error message to an IT administrator of the one or more relevant clinical departments using the browser application 103. In this example, the IT administrator has selected to deploy a central log database via the central operational management component 3000. The central log database corresponds to the central message storage unit 3001. Accordingly, the IT administrator submits a web service request with fitting parameters to the central message storage unit 3001 via the central log RSC 3002. The submitted web service request includes fitting parameters such as error type, time of error, error message text, error message source, etc. In response to the received web service request, the central message storage unit 3001 communicates all messages corresponding with the fitting parameters to the message viewer task 2001 via the central log RSC 3002. The message viewer task 2001 may then display the returned message to the IT administrator.

Still referring to FIG. 2, in a fifth example, the message viewer task unit 2001 of the service IT administration component 2000 again obtains and displays error messages. In this example, the IT administrator has selected to deploy one or more local log files 2100 and 1100, which were transferred to his machine with additional services (or to a shared file system). This is different from the previous example in which the central log database was deployed. In this fifth example, the message viewer task unit 2001 accesses and opens the one or more log files 2100 and 1100. The message viewer task unit 2001 then displays one or more error messages from the one or more log files 2100 and 1100.

In a sixth example, an audit viewer task unit 2003 of the service IT administration component 2000 displays recent audit messages to an IT administrator for review. The audit messages may be related to a clinical activity. Example clinical activities include recording data, obtaining images, and generating reports relating to diagnosis and treatment. In this example, the IT administrator selects a relevant time interval. This selection may be made based on user input of the IT administrator. In response to this user input, the audit viewer task unit 2003 attempts to access and query the audit repository unit 3003 of the central operational management component 3000 via the central audit RSC 3004. In response to the received query, the audit repository unit 3003 extracts all audit messages corresponding to the received query. The audit repository unit 3003 then provides the corresponding messages to the auto viewer task unit 2003 via the central audit RSC 3004. The audit viewer task unit 2003 then displays the received messages to the IT administrator on a display.

The above described examples illustrate example communications and operations performed by the various different units of the local application infrastructure component 1000, the service IT administration component 2000 and the central operational component 3000 of an example embodiment of a sub-system architecture.

Examples of different local infrastructure services and the configurations of the IS units providing these services to software applications are detailed below. From the previous disclosure and examples described above with respect to FIG. 2, one skilled in the art will readily be able to apply the teachings of the previous disclosure and examples to the configurations of the IS units and various connections shown in FIGS. 3-25B.

Figure 3:
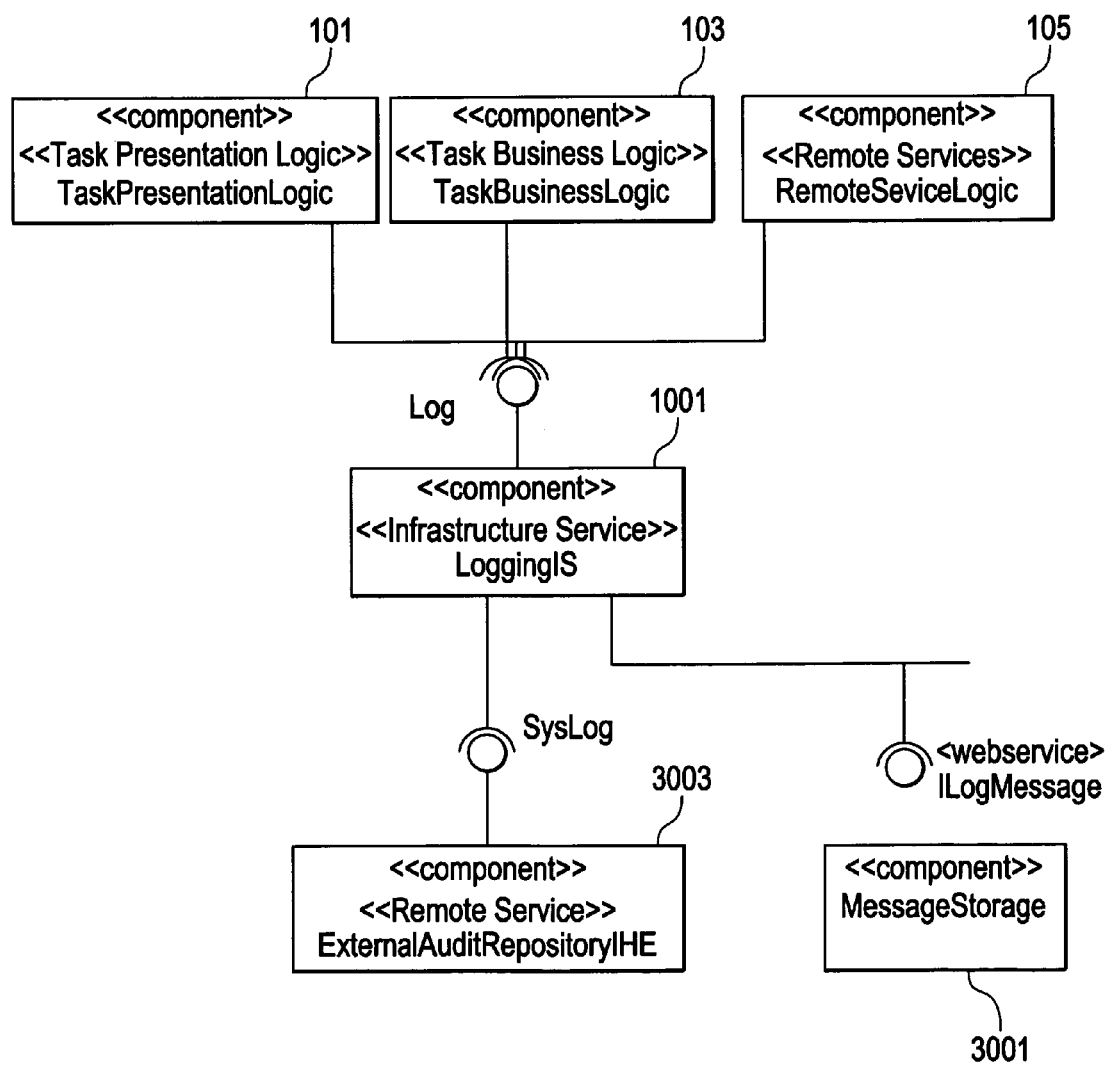
FIG. 3 illustrates a software application including a presentation logic layer 101, a business logic layer and a remote service logic layer receiving logging services according to an example embodiment.

Referring to FIG. 3, a software application includes three layers. In particular, the software application 100 includes a presentation logic layer 101, a business logic layer 103 and a remote services logic layer 105. The presentation logic layer 101 provides a user interface for the software application, the business logic layer 103 processes business calculations for the software application, and the remote service logic layer 105 provides access to enterprise services used by the software application. The layers of the software application will be readily understood by one skilled in the art and thus, the specifics of these layers is not discussed further herein for the sake of brevity.

In the example of FIG. 3, the software application receives logging services from the logging IS unit 1001. The software application communicates with the logging IS unit 1001 via a log interface. The log interface is a simple programming interface or API. The logging IS unit 1001 provides logging of messages for the software application, as well as tool kits and services required by the software application. For providing logging services to the software application, the local logging IS unit 1001 provides and receives information or services from various other components of the system such as an external audit repository 3003 and a central message storage unit 3001 of the operational management component 3000.

Figure 4:
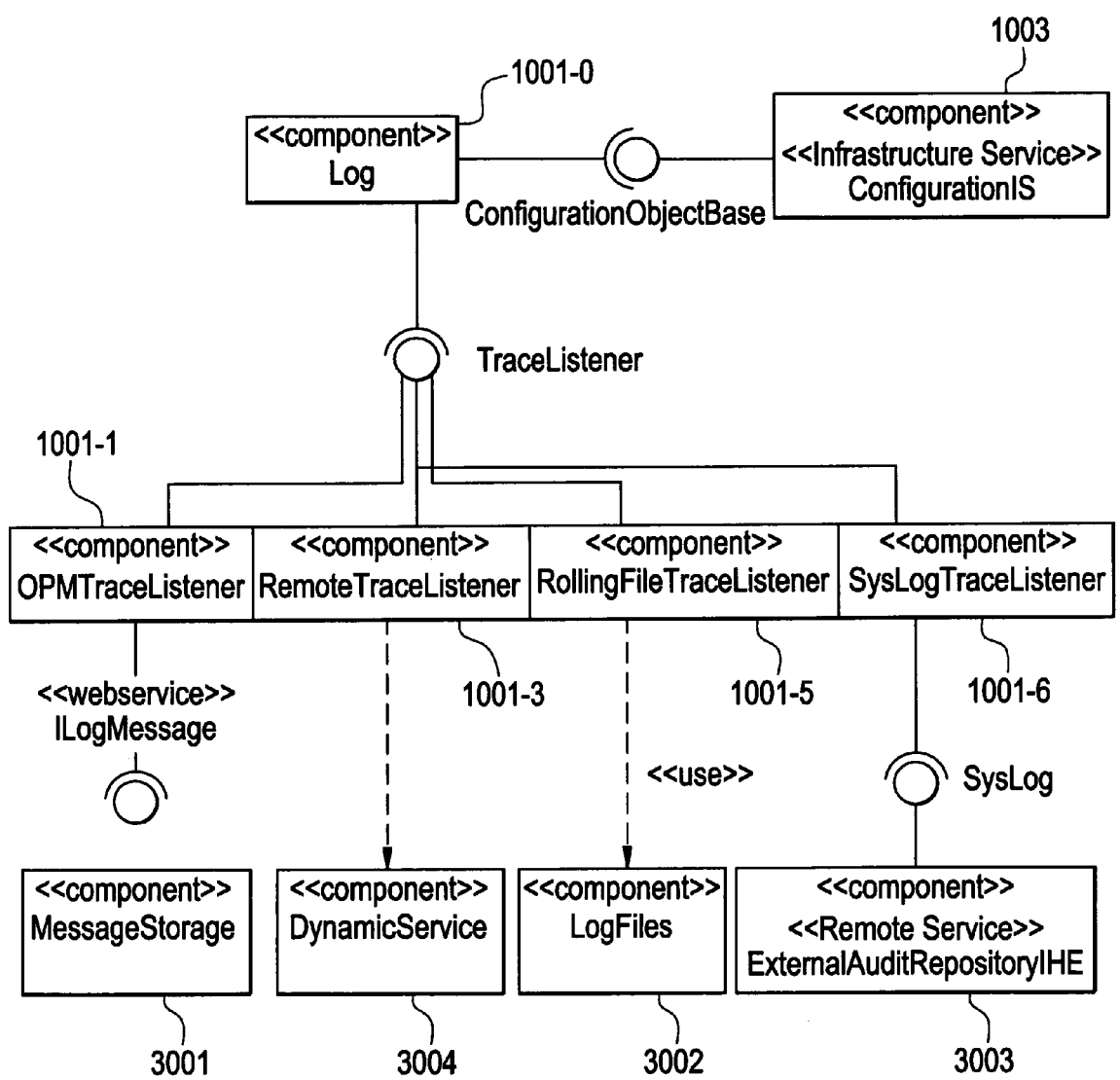
FIG. 4 illustrates an example configuration of a logging IS unit providing logging services to a software application.

FIG. 4 is an expanded version of the logging IS unit 1001. Referring to FIG. 4, the logging IS unit 1001 includes various components. In particular, the logging IS unit 1001 includes a log 1001-0 and OPM trace listener 1001-1, a remote trace listener 1001-3, a rolling file trace listener 1001-5 and a system log trace listener 1001-6. As noted by the numbering 1000-, these components correspond the providers previously described with respect to FIG. 2. Stated differently, these components establish and provide communications between an IS unit of a local application infrastructure component 1000 and a component of the central operational management component 3000 via a web service or remote access according to an example embodiment of a sub-system architecture.

In FIG. 4, the OPM trace listener 1001-1 communicates with the message storage unit 3001 of the operational management component 3000 via the web service ILogMessage. The remote trace listener 1001-3 communicates with the dynamic service 3004, the rolling file trace listener 1001-5 communicates with the log files 3002, and the syslog trace listener 1001-6 communicates with the external audit repository 3003. The log component 1001-0 receives configuration information useful to the logging IS unit 1001 from a configuration IS unit 1003. An example of a configuration IS unit 1003 is described in greater detail later with respect to FIGS. 5 and 6.

Through an example trace listener such as the trace listener of a MICROSOFT ENTERPRISE LIBRARY™, for example, various local and remote sinks for log messages can be configured to the logging IS unit 1001. Through the remote trace listener 1001-3, message repositories and their respective trace listener can be transparently accessed from a Rich Thin Client (RTC).

As previously described, the local infrastructure service component 1000 may provide a variety of services, and FIGS. 3 and 4 illustrate one of these services, i.e., a logging service. One skilled in the art would readily understand that the teachings described above relating to an infrastructure service providing logging using the logging IS unit 1001 are applicable to the configuration service illustrated in FIGS. 5 and 6. Further, one should note that while the logging IS unit is labeled 1001, the configuration IS unit illustrated in FIG. 5 is labeled 1003, and IS units described in the remaining figures will be labeled as 1005, 1007, 1009, etc. to indicate the teachings above referring to the logging IS unit 1001 would be applicable to these later described IS units providing services to a software application of a medical and/or financial institution.

Figure 5:
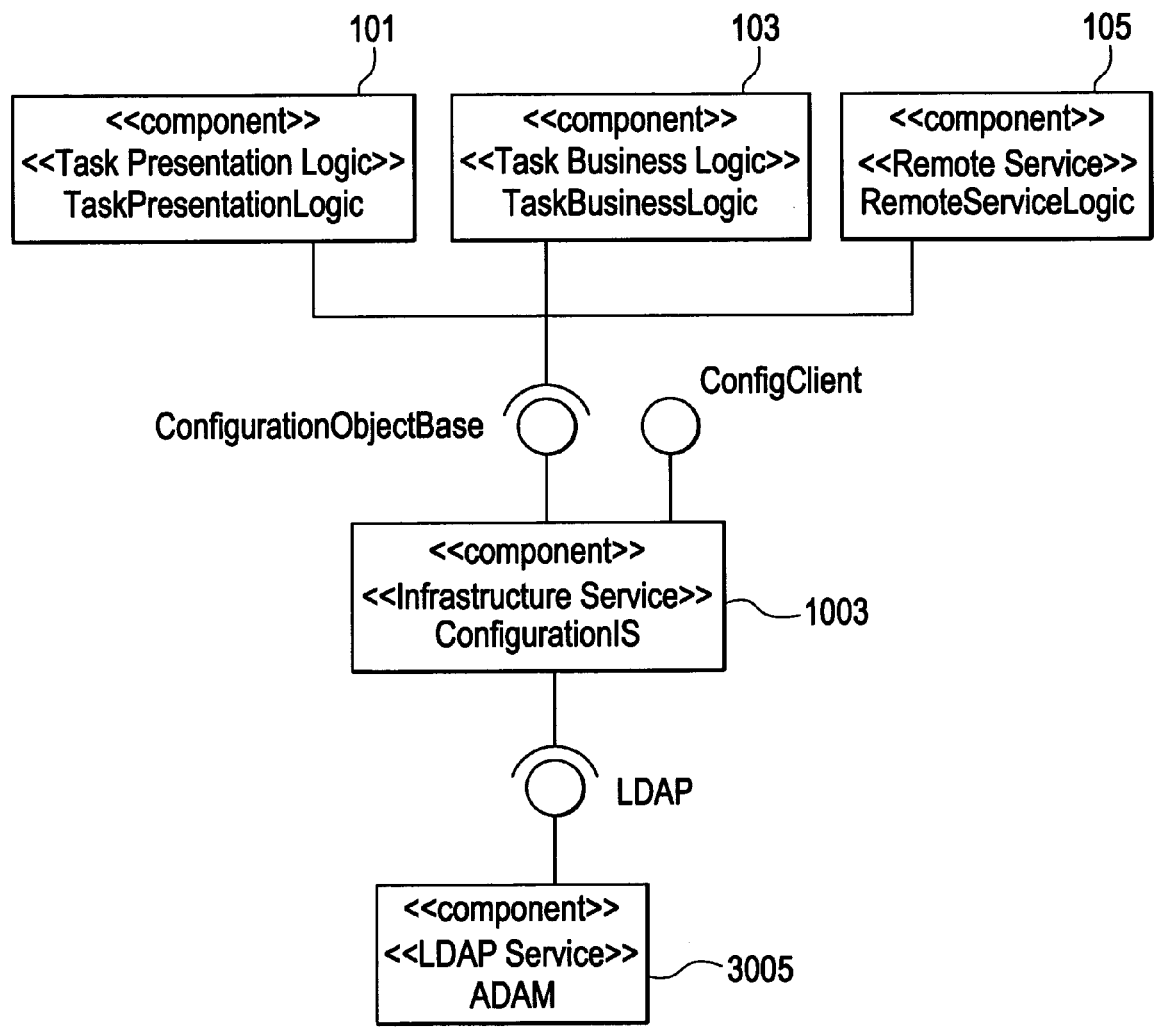
FIG. 5 illustrates an example embodiment for providing configuration services with a configuration IS unit to a software application.

As shown in FIG. 5, the configuration IS unit 1003 may again receive information from the presentation logic layer 101, the business logic layer 103, and the remote services logic layer 105 of a software application. Further, FIG. 5 indicates that the configuration IS unit 1003 of a local application infrastructure component 1000 may receive and/or provide information to MICROSOFT ACTIVE DIRECTORY MODE™ (ADAM), for example.

Figure 6:
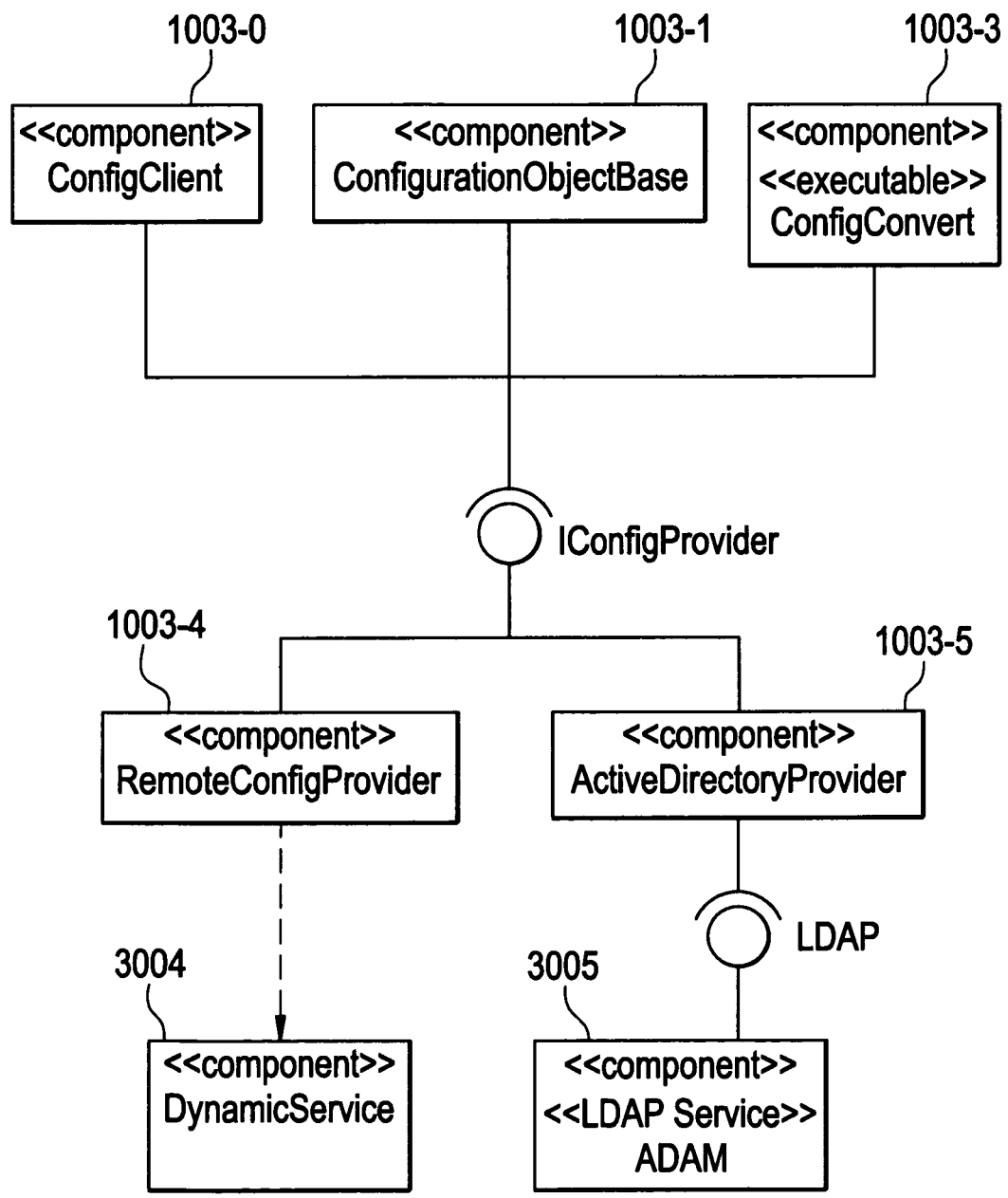
FIG. 6 illustrates an example configuration of the configuration IS unit of FIG. 5.

FIG. 6 described below relates to FIG. 5 in a manner similar to which FIG. 4 relates to FIG. 3. FIG. 6 illustrates various components of the configuration IS unit 1003. In particular, the configuration IS unit 1003 includes a configuration client 1003-0, a configuration object base 1003-1, and a configuration converter 1003-3, which may communicate with a remote configuration provider 1003-4 and an active directory provider 1003-5 via a simple programming interface IConfigProvider. The remote configuration provider 1003-4 then communicates with a dynamic service 3004 of the central operational management component 3000, and the active directory provider 1003-5 communicates with an active directory application mode 3005.

The configuration client 1003-0 is an administration part of the service for reading and writing configuration data. Calls to the configuration client 1003-0 provide explicit configuration context information for the configuration item that is read or written. The configuration object base 1003-1 is a context aware base for configuration of objects used inside components. The configuration converter 1003-3 is a tool for import of configuration data into a configuration repository. The remote configuration provider 1003-4 is a provider that gives transparent remote access to the active directory application mode configuration repository via dynamic service, without requiring physical access rights. The active directory provider 1003-5 is a provider that gives access to an active directory application mode or an active directory via a Lightweight Directory Access Protocol (LDAP).

Figure 7:
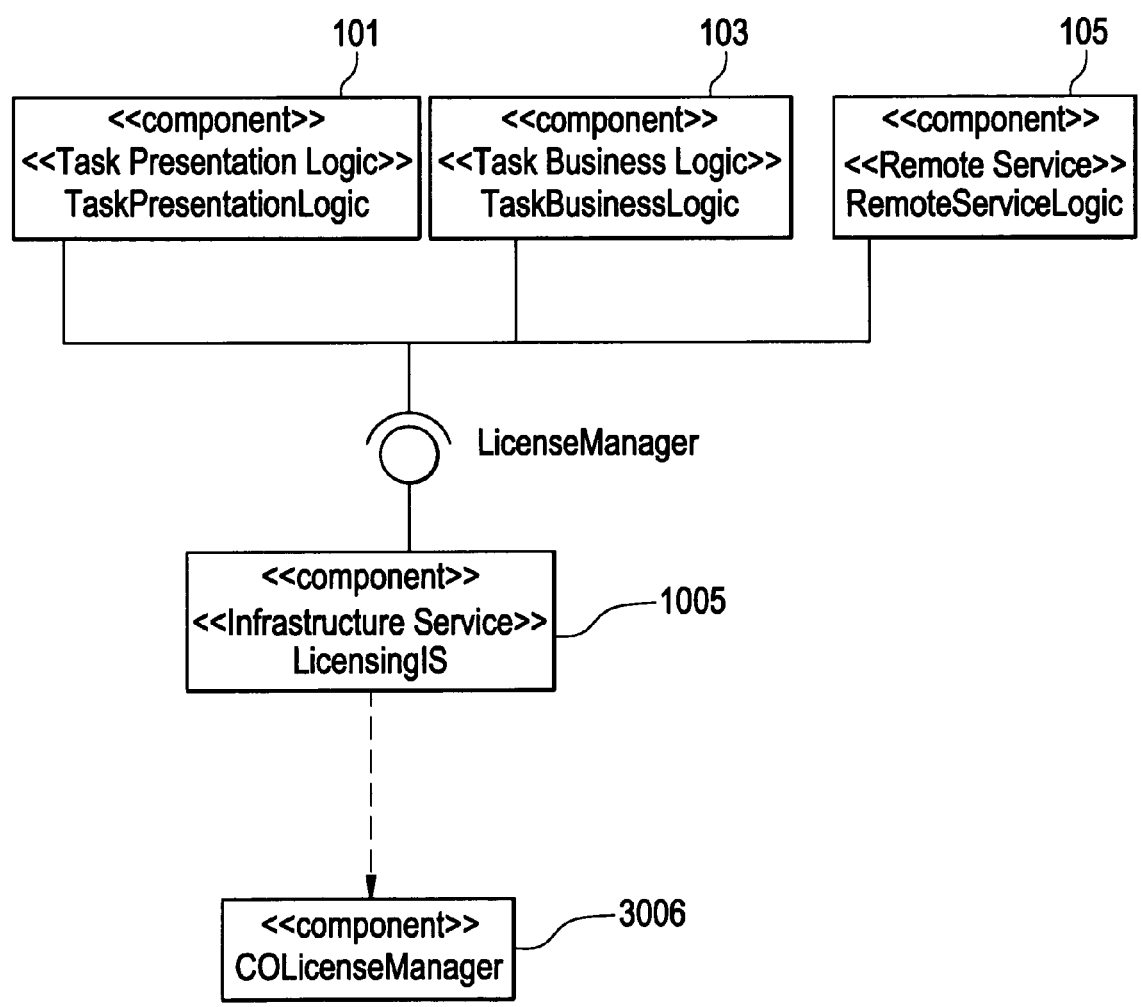
FIG. 7 illustrates an example embodiment for providing licensing services with a licensing IS unit to a software application.
Figure 8:
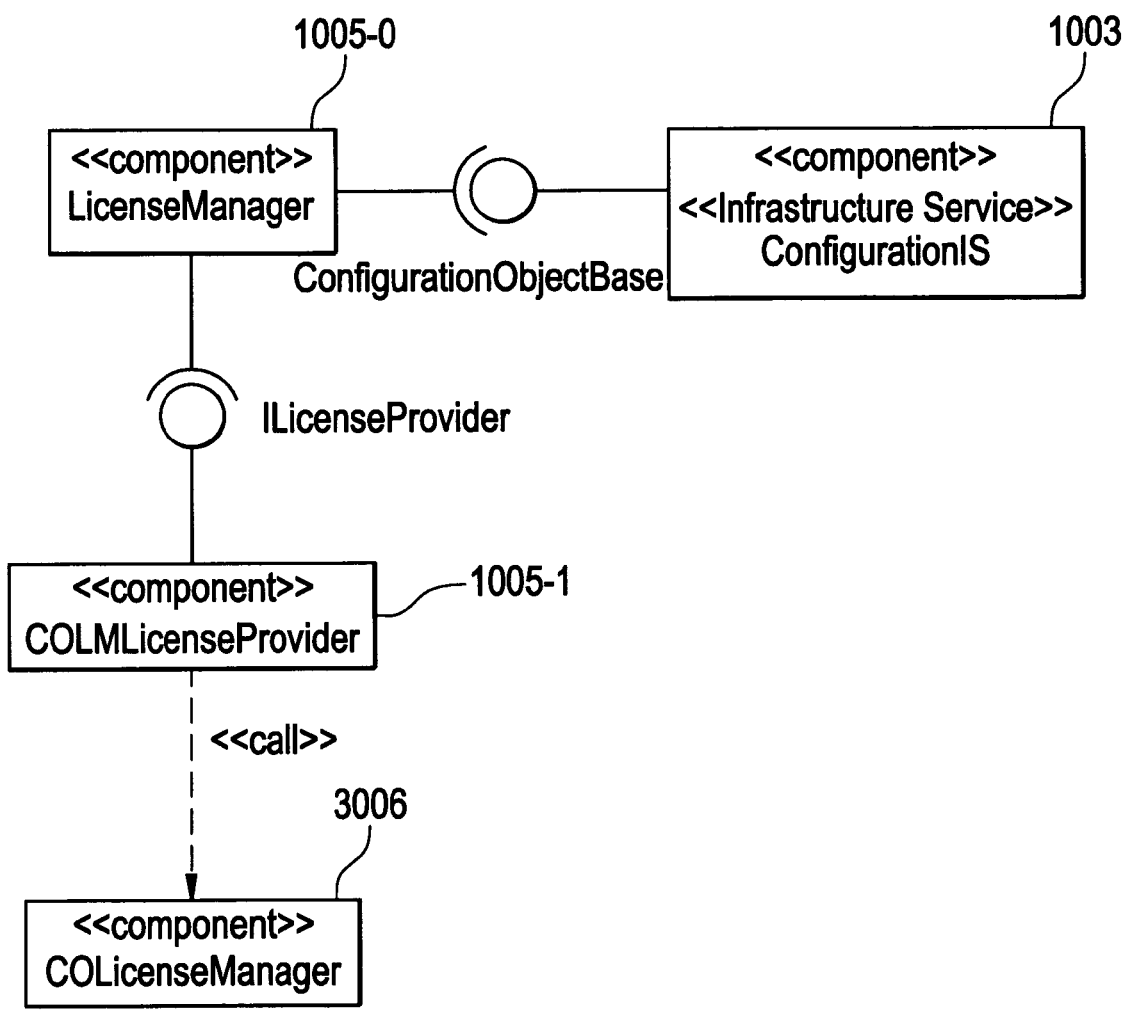
FIG. 8 illustrates an example configuration of the licensing IS unit of FIG. 7.

FIGS. 7 and 8 illustrate an example licensing service which may be provided to a software application being implemented by a medical and/or financial institution. In FIG. 7, the licensing IS unit 1005 may receive information from the presentation logic layer 101, the business logic layer 103, or the remote logic service layer 105 via a interface LicenseManager, which is a simple programming interface or API. Further, the licensing IS unit 1005 may provide information to a co-license manager, which may be deployed locally within the licensing IS unit 1005, or centrally as part of the operational management component 3000. In FIG. 7, the co-license manager 3006 is illustrated as a component of the operational management component 3000.

FIG. 8 illustrates an example configuration of the licensing IS unit 1005. Referring to FIG. 8, the licensing IS unit 1005 includes a license manager 1005-0 and a COLM license provider 1005-1. The license manager 1005-0 may receive information from the configuration unit 1003 via a configuration object base interface. Further, the license manager 1005-0 may communicate with the COLM license provider 1005-1 via the interface ILicenseProvider, which is a simple programming interface or API.

Figure 9:
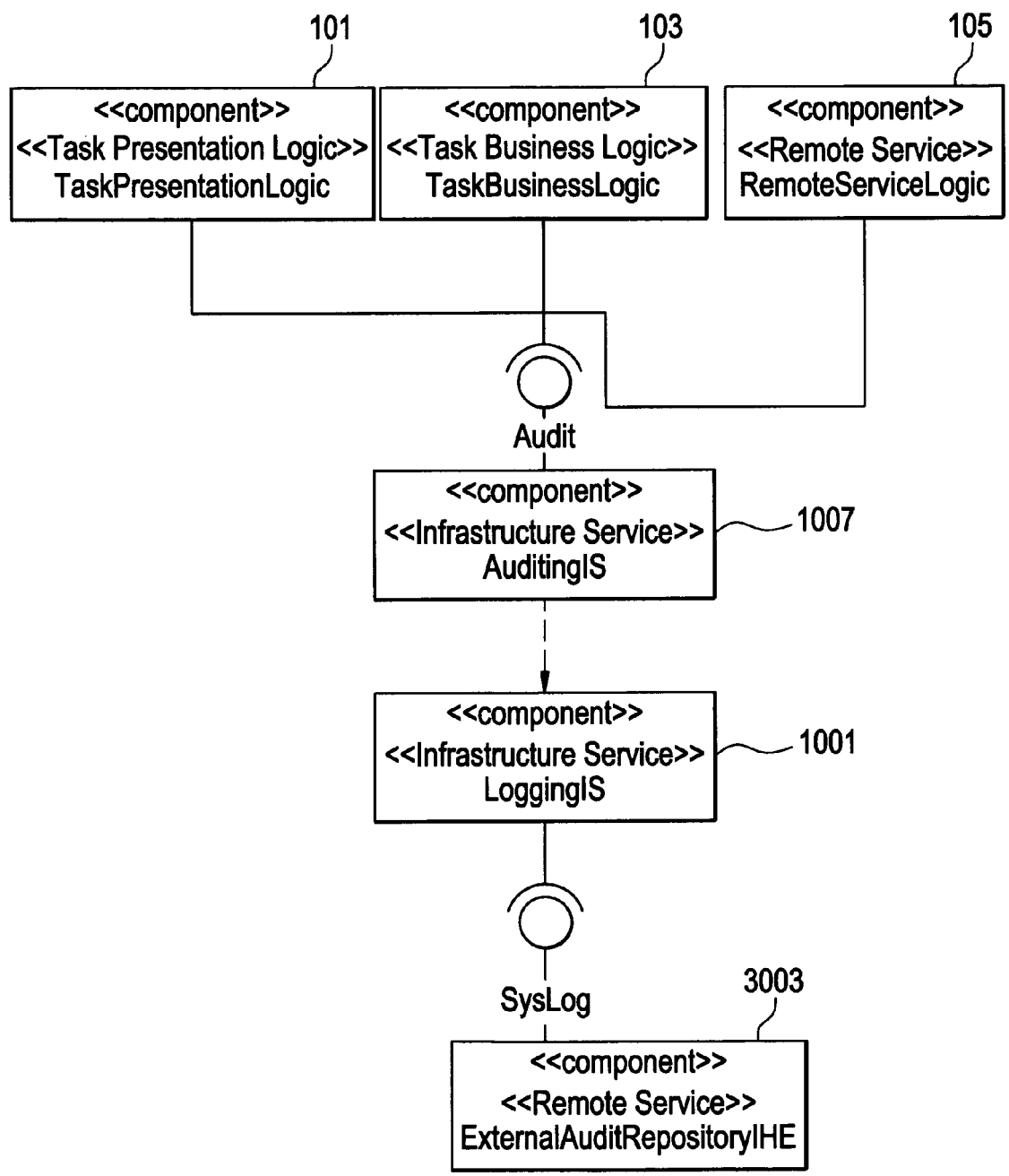
FIG. 9 illustrates an example embodiment for providing auditing services with a auditing IS unit to a software application.
Figure 10:
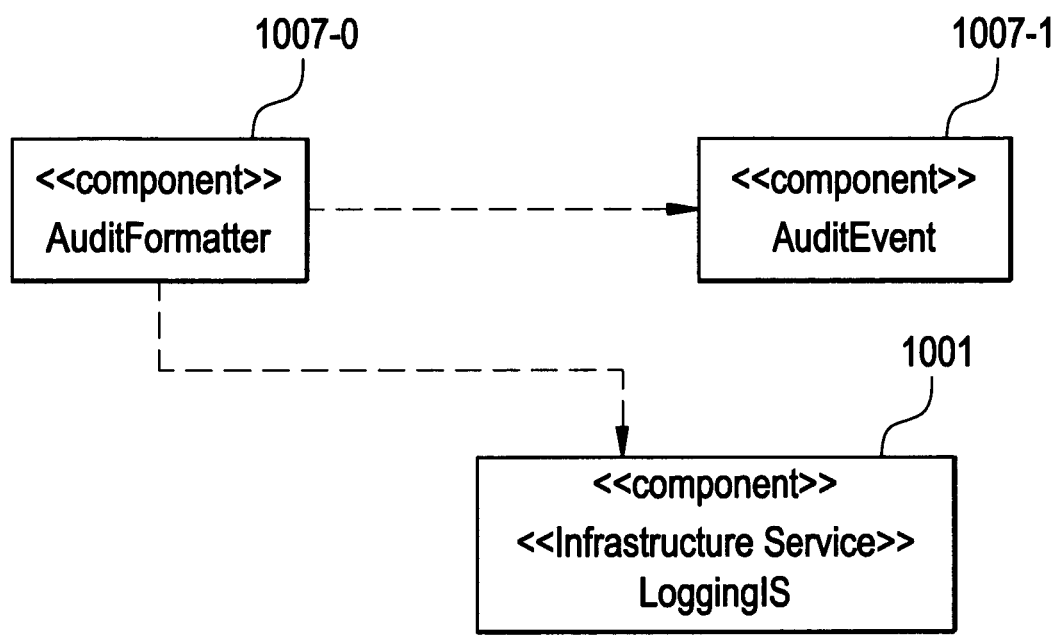
FIG. 10 illustrates an example configuration of the auditing IS unit of FIG. 9.

FIGS. 9 and 10 refer to an auditing service which may be provided to a software application. As shown in the example of FIG. 9, an auditing service provided by a local application infrastructure component 1000 may be provided to a software application in conjunction with a logging service provided by another local infrastructure component 1000. In FIG. 9, an auditing service is provided by the auditing IS unit 1007, which communicates with the logging IS unit 1001. The auditing IS unit 1007 may receive information from the presentation logic layer 101, business logic layer 103, and/or remote service logic layer 105 of a software application. The auditing IS unit 1007 then provides auditing information to the external audit repository 3003 via the logging IS unit 1001 and a web service SysLog, which is a remote connection as shown in FIG. 9.

FIG. 10 provides an example configuration of the auditing IS unit 1007. Referring to FIG. 10, the auditing IS unit 1007 includes an audit event component 1007-1 and an audit formatter 1007-0. The audit formatter 1007-0 may format an audit event according to an IHE audit message format and may send the formatted event to the external audit repository unit via the logging IS unit 1001 as previously shown in FIG. 9.

Figure 11:
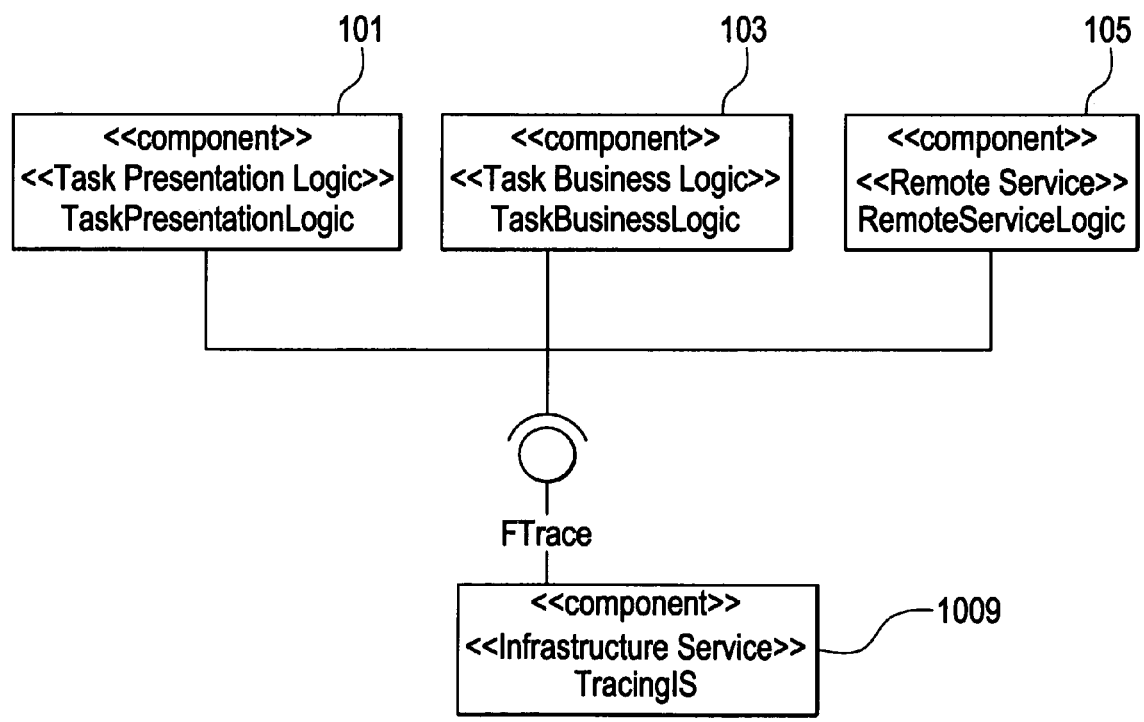
FIG. 11 illustrates an example embodiment for providing tracing services with a tracing IS unit to a software program.
Figure 12:
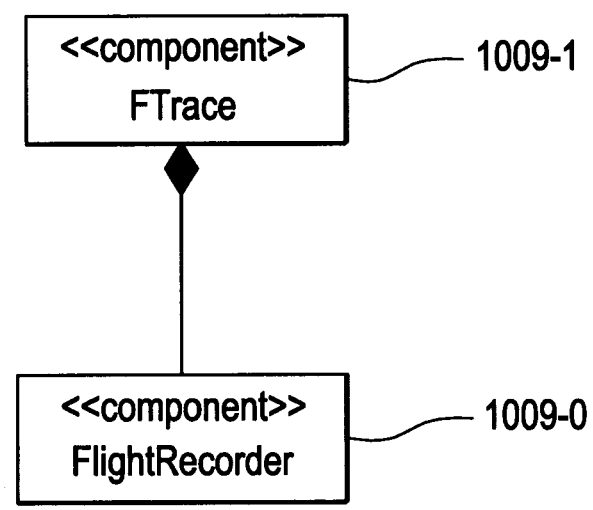
FIG. 12 illustrates an example configuration of the tracing IS unit of FIG. 11.

FIGS. 11 and 12 illustrate an example of a tracing service, which may be provided by a local application infrastructure component 1000. In particular, FIG. 11 illustrates a tracing IS unit 1009 communicating with the presentation logic layer 101, the business logic layer 103 and the remote service logic layer 105 of a software application via the Ftrace interface, which is a simple programming interface of API. The tracing IS unit 1009 stores trace messages from applications, tool kits and services, and local files, and is used for debugging and development purposes.

FIG. 12 illustrates an example configuration of the tracing IS unit including Ftrace component 1009-1 and a flight recorder 1009-0. The flight recorder 1009-0 can be configured into FTrace and collects trace data and memory. The trace data may be dumped upon request in order to support development.

Figure 13:
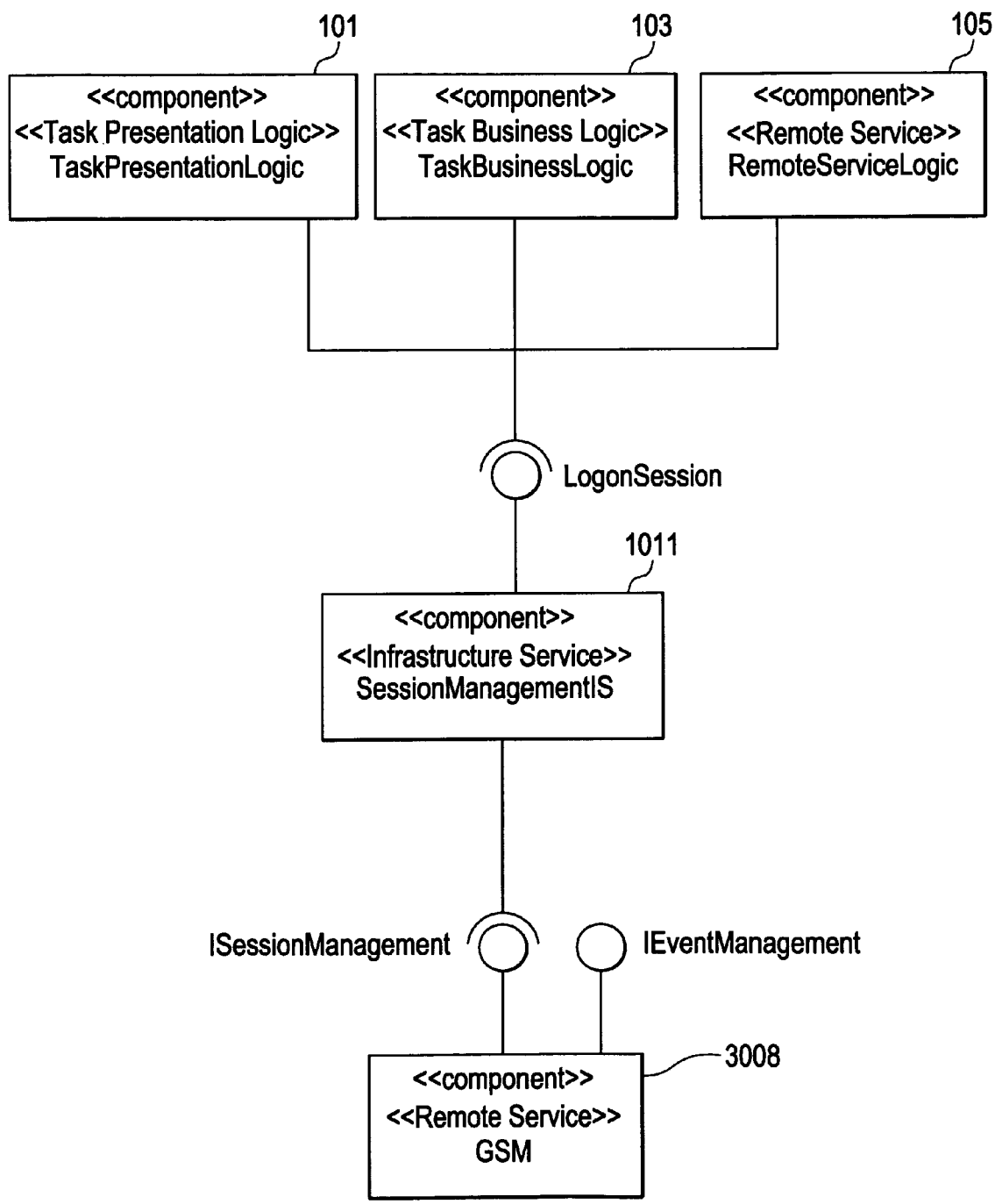
FIG. 13 illustrates an example embodiment for providing session management service with a session management IS to a software application.
Figure 14:
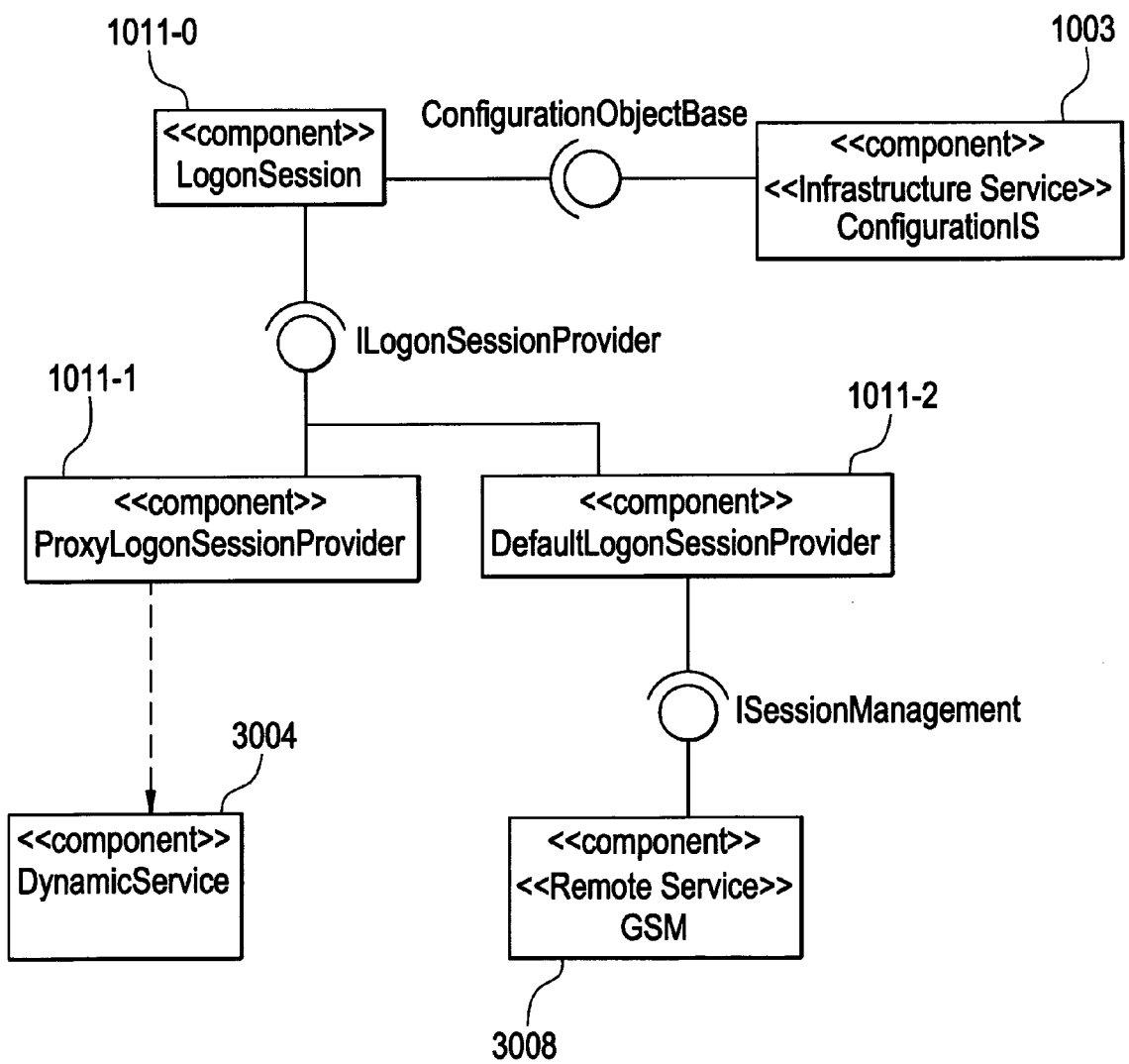
FIG. 14 illustrates an example configuration of the session management IS unit of FIG. 13.

FIGS. 13 and 14 refer to a session management service, which may be provided by a local application infrastructure component 1000. The session management service allows creating and propagating sessions and user information locally among applications for each user. FIG. 13 illustrates a session management IS unit 1011 communicating with a presentation logic layer 101, a business logic layer 103, and a remote service logic layer 105 via a LogonSession interface, which is a simple programming interface or API. Further, the session management IS unit 1011 may communicate with a global session manager (GSM) 3008 via a web service.

FIG. 14 illustrates an example configuration of the session management IS unit 1011. As shown in FIG. 14, the session management IS unit 1011 may include a log on session component 1011-0 and proxy log on provider 1011-1 and a default log on session provider 1011-2. The log on session 1011-0 receives information from the configuration IS unit 1003 via the interface ConfigurationObjectBase and communicates with the proxy log on provider 1011-1 and the default log on session provider 1011-2 via the interface ILogonSessionProvider, which is a simple programming interface or API. Still further, the proxy log on session provider 1011-1 may communicate with a dynamic service component 3004 of an operational management component 3000, and the default log on session provider 1011-2 may communicate with a GSM via a session management web service.

Figure 15:
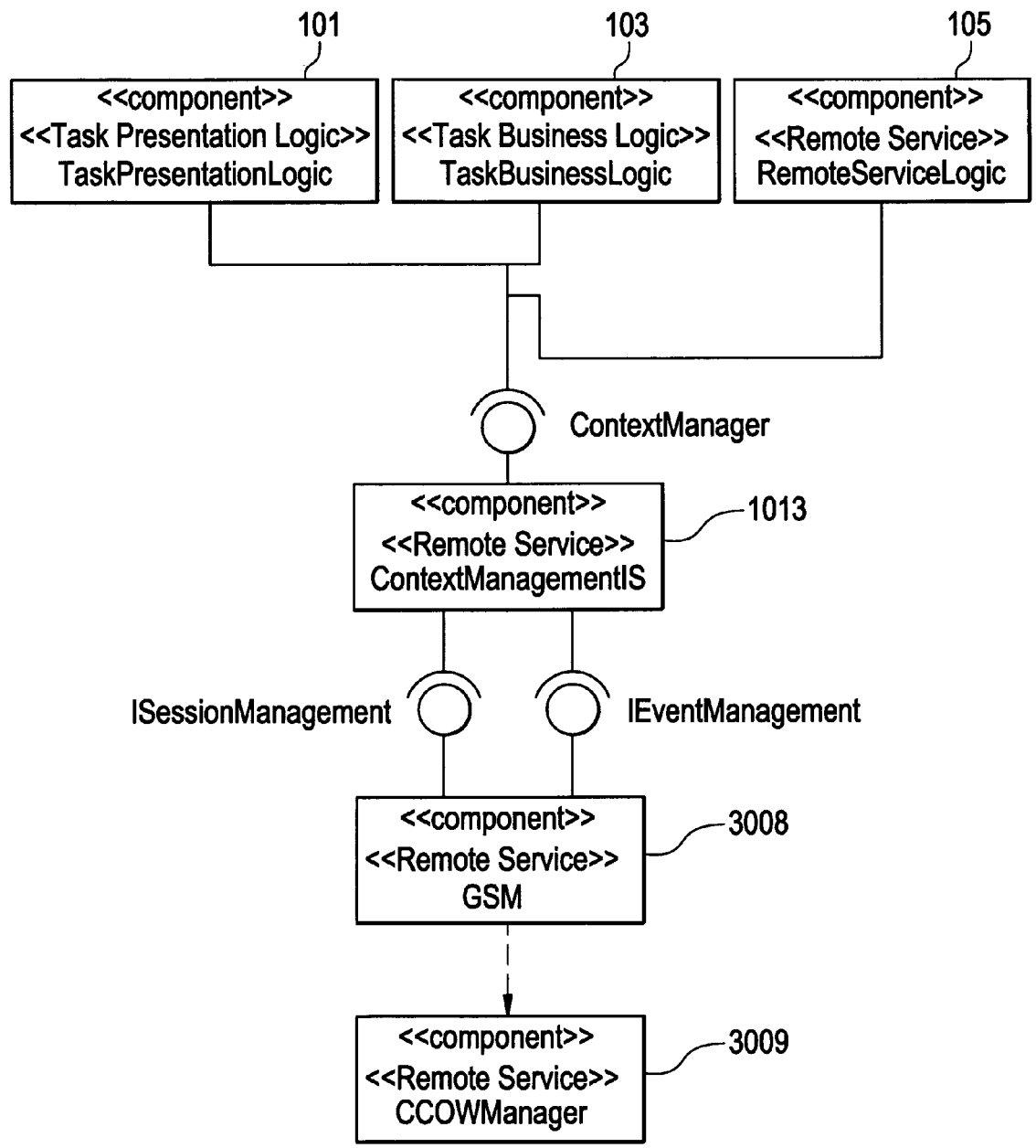
FIG. 15 illustrates an example embodiment for providing context management services with a context management IS unit to a software application.

FIG. 15 illustrates an example of a context management service offering CCOW integration. In FIG. 15, the context management IS unit 1013 receives information from the presentation logic layer 101, the business logic layer 103 and/or the remote service logic layer 105 via the interface ContextManager, which is a simple programming interface or API. Further, the context management IS unit 1013 may communicate with a GSM 3008 via a session management interface web service ISessionManagement or an event management web service IEventManagement. The GSM 3008 may then communicate with a CCOW 3009 if appropriate.

Figure 16:
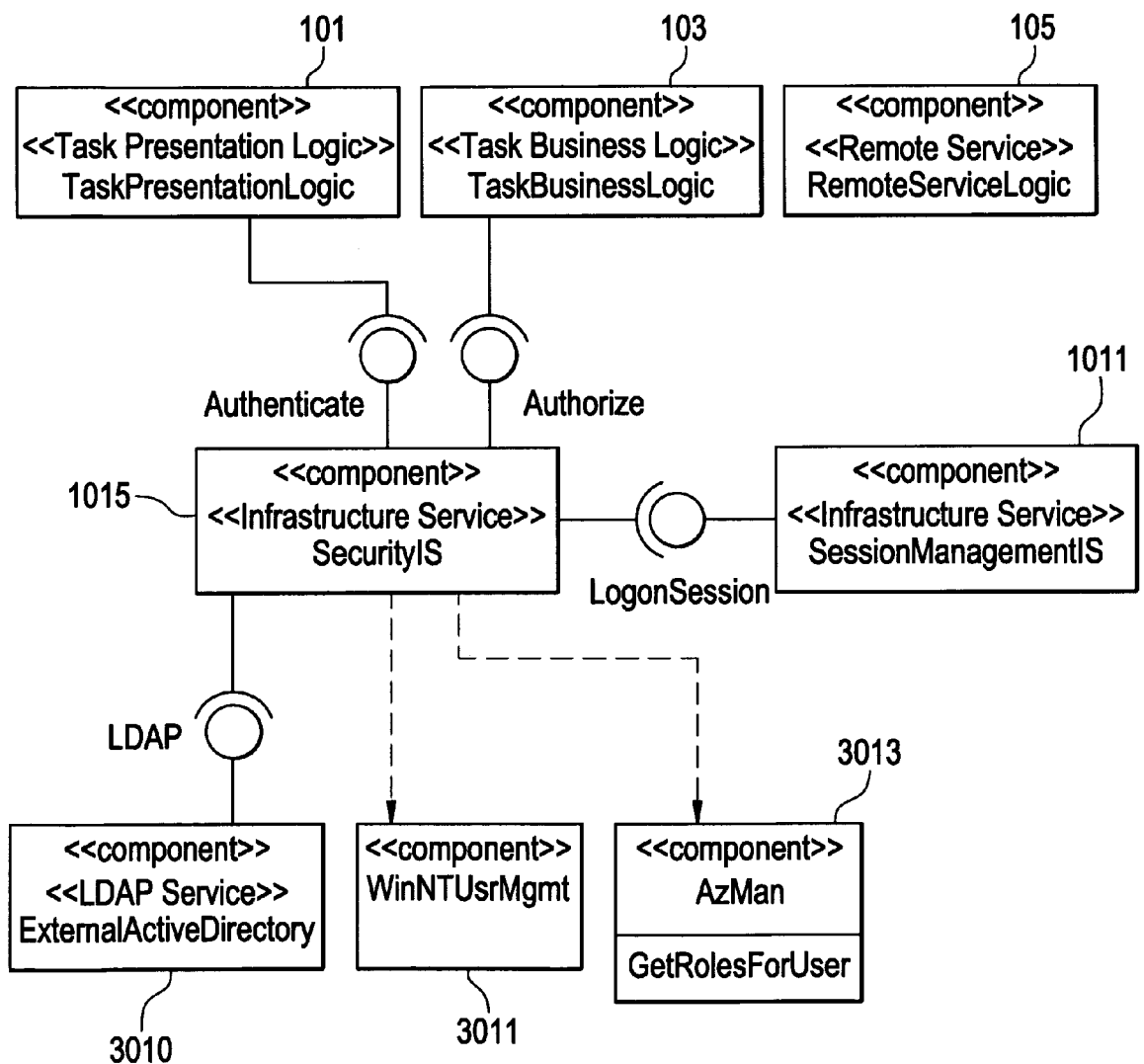
FIG. 16 illustrates an example embodiment for providing security services with a security IS unit to a software application.
Figure 17:
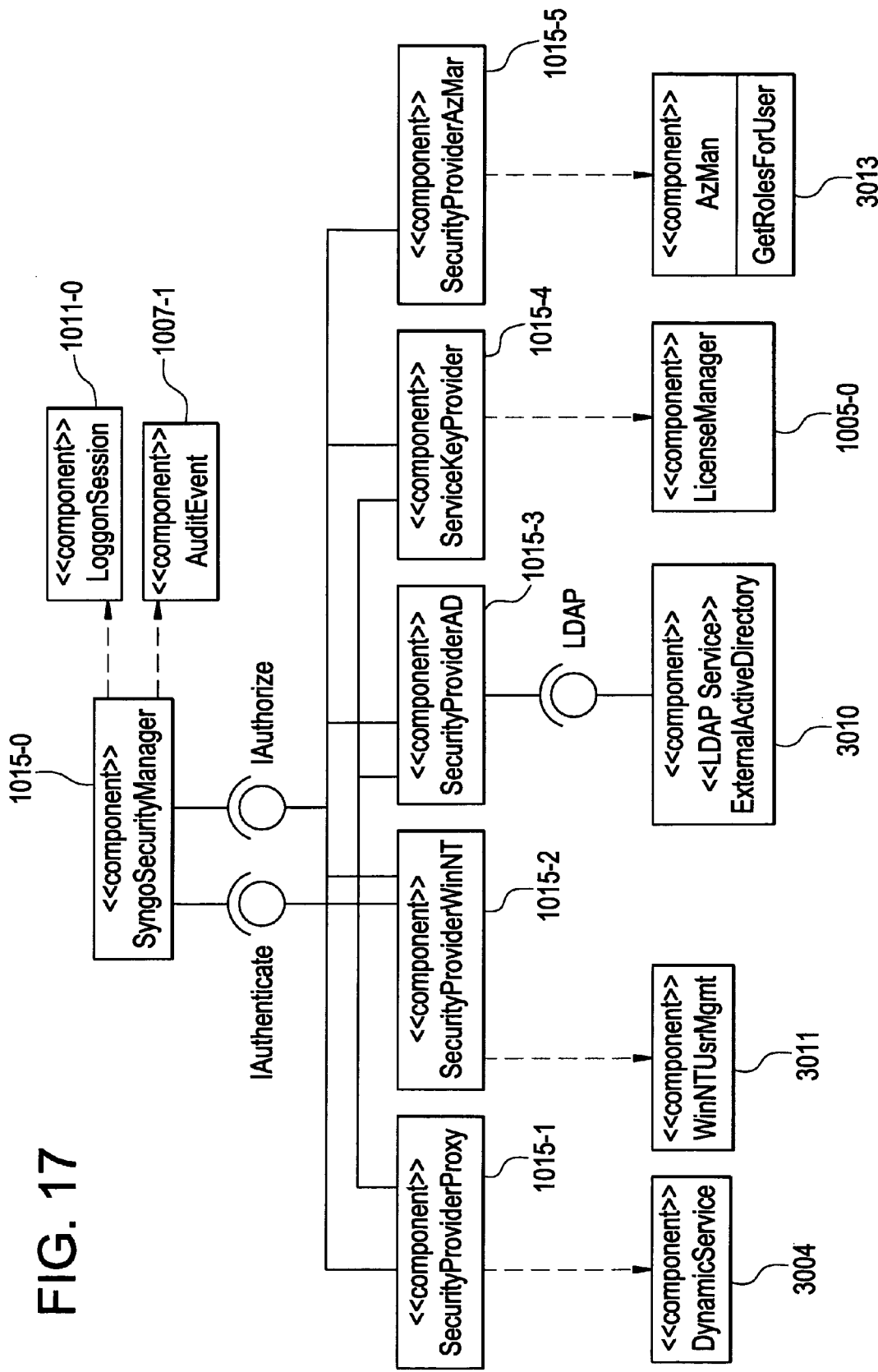
FIG. 17 illustrates an example configuration of the security IS unit of FIG. 16.

FIGS. 16 and 17 illustrate an example security service, which may be provided to a software application. In FIG. 16, the security IS unit 1015 receives information from the session management IS unit 1011, which was previously described with respect to FIGS. 13 and 14. Further, the security IS unit 1015 receives information from a presentation logic layer 101 of a software application via an authentication interface Authenticate and information from a business logic layer 103 via an authorization interface Authorize. These interfaces are simple programming interfaces or APIs. The security IS unit 1015 may also provide information to an external active directory 3010, a user management component 3011 and/or AZMAN™ 3013 via a corresponding web service as shown in FIG. 16. Generally, this security IS unit 1015 is responsible for allowing role based user access to the system and user management for authentication and authorization, based on MICROSOFT ACTIVE DIRECTORY™ as well as locally with a local user management component.

FIG. 17 illustrates an example configuration of the security IS unit 1015. Referring to FIG. 17, the security IS unit 1015 includes a security manager 1015-0 and one or more security providers 1015-1 through 1015-5 for communication to components of an operational management component 3000. The security manager 1015-0 may communicate with a log on session component 1011-0 of a session management IS unit 1011 and/or the audit event component 1007 of the auditing IS unit 1007.

Figure 18:
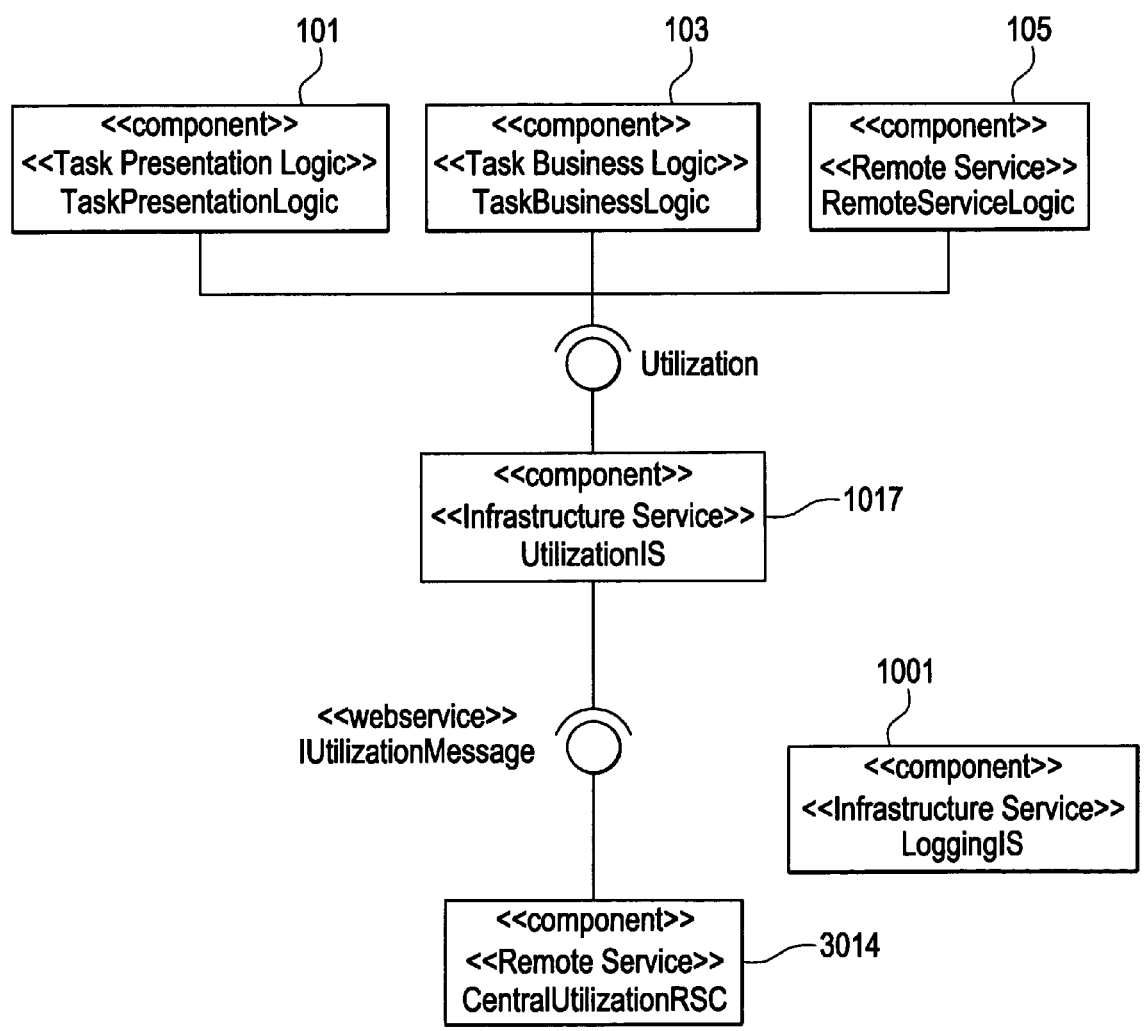
FIG. 18 illustrates an example embodiment for providing utilization services with a utilization IS unit to a software application.
Figure 19:
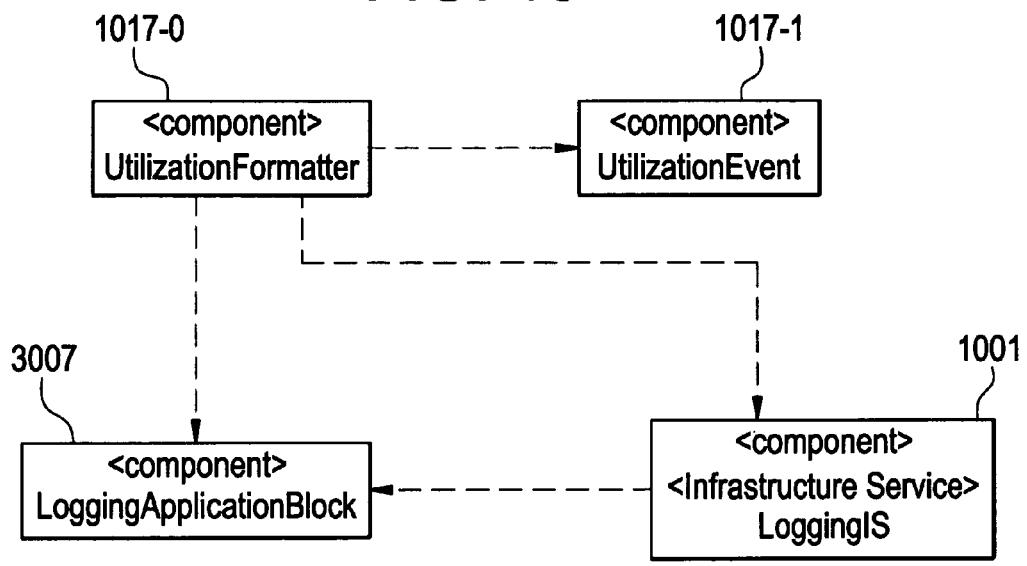
FIG. 19 illustrates an example configuration of the utilization IS unit of FIG. 18.

FIGS. 18 and 19 illustrate a utilization service, which may be used by a software application. Referring to FIG. 18, the utilization IS unit 1017 communicates with the presentation logic layer 101, the business logic layer 103, and the remote service logic layer 105 of a software application via a utilization interface Utilization, which is a simple programming interface or API. Further, the utilization IS unit 1017 may communicate with a central utilization RSC 3014 of an operational management component 3000 via a web service IUtilizationMessage. Generally, the utilization IS unit 1017 collects information about usage statistics and staff performance. Further, the utilization service IS 1017 may also communicate with the logging IS unit 1001, which was previously described with respect to FIGS. 3 and 4. The utilization IS unit 1017 may write utilization events to a local file within the application infrastructure component 1000 or to a central utilization repository of the operational management component 3000.

FIG. 19 shows an example configuration of the utilization IS unit 1017. The example configuration of the utilization IS unit 1017 shown in FIG. 19 includes a utilization formatter 1017-0 and a utilization event component 1017-1. The utilization formatter 1017-0 formats a utilization event 1017-1 appropriately and sends the formatted event to the local file or central repository using the logging IS unit 1001.

Figure 20:
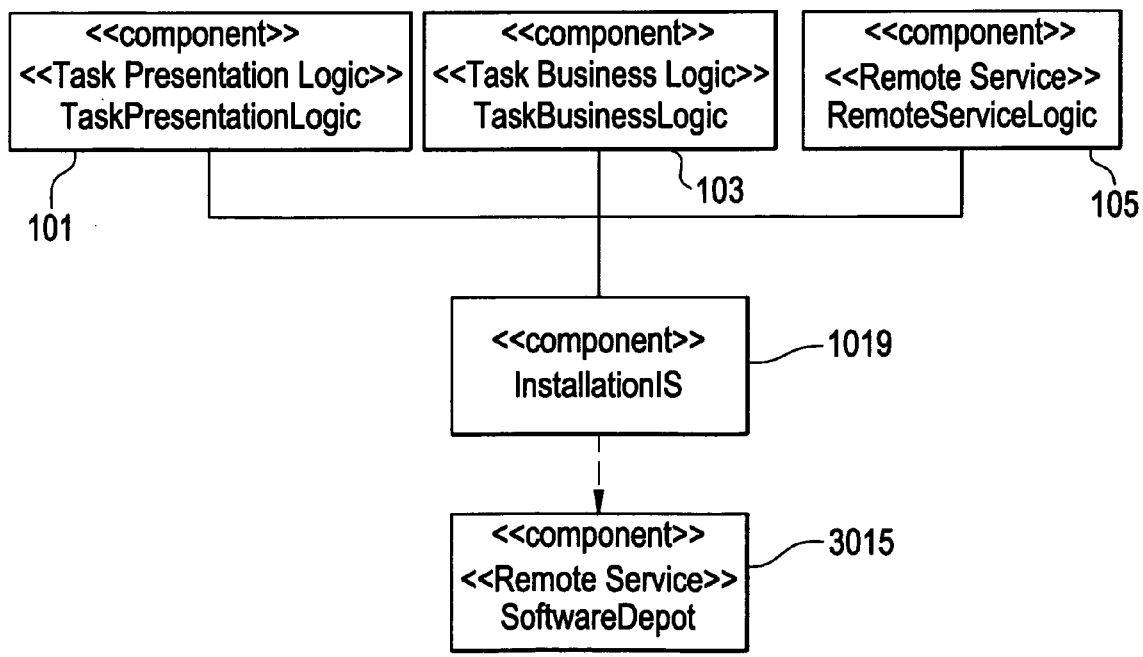
FIG. 20 illustrates an example embodiment for providing installation services with a installation IS unit to a software application.

FIG. 20 illustrates an example of an installation service, which may be provided to a software application by the local application infrastructure component 1000. As shown in FIG. 20, the installation IS unit 1019 may communicate with a software depot 3015 of the operation management component 3000 to obtain applications, updates and upgrades for various software applications implemented by a medical and/or financial institution. The installation IS unit 1019 then communicates the applications, updates and/or upgrades to the presentation logic layer 101, the business logic layer 103 and/or remote services logic layer 105 via a simple programming interface or API.

Figure 21:
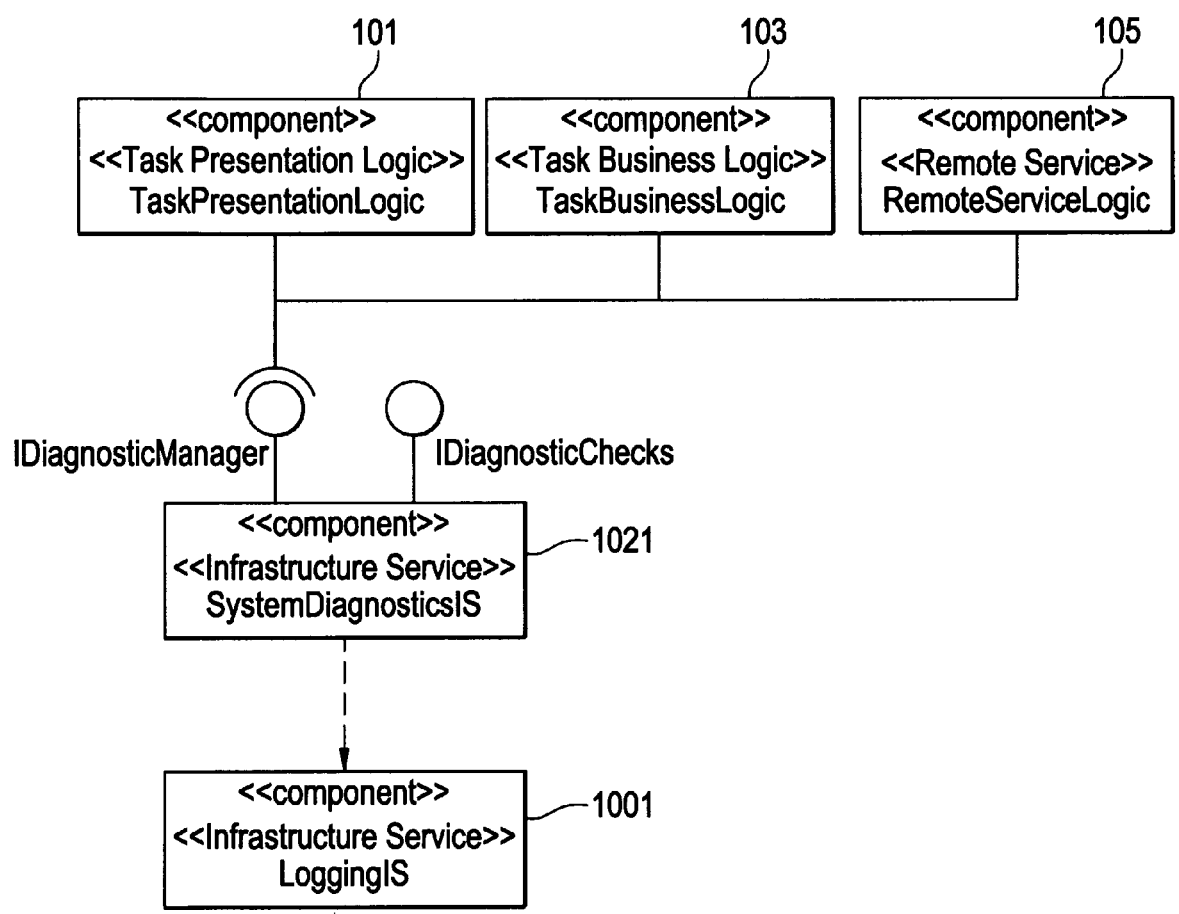
FIG. 21 illustrates an example embodiment for providing system diagnostic services with a system diagnostic IS unit to a software application.
Figure 22:
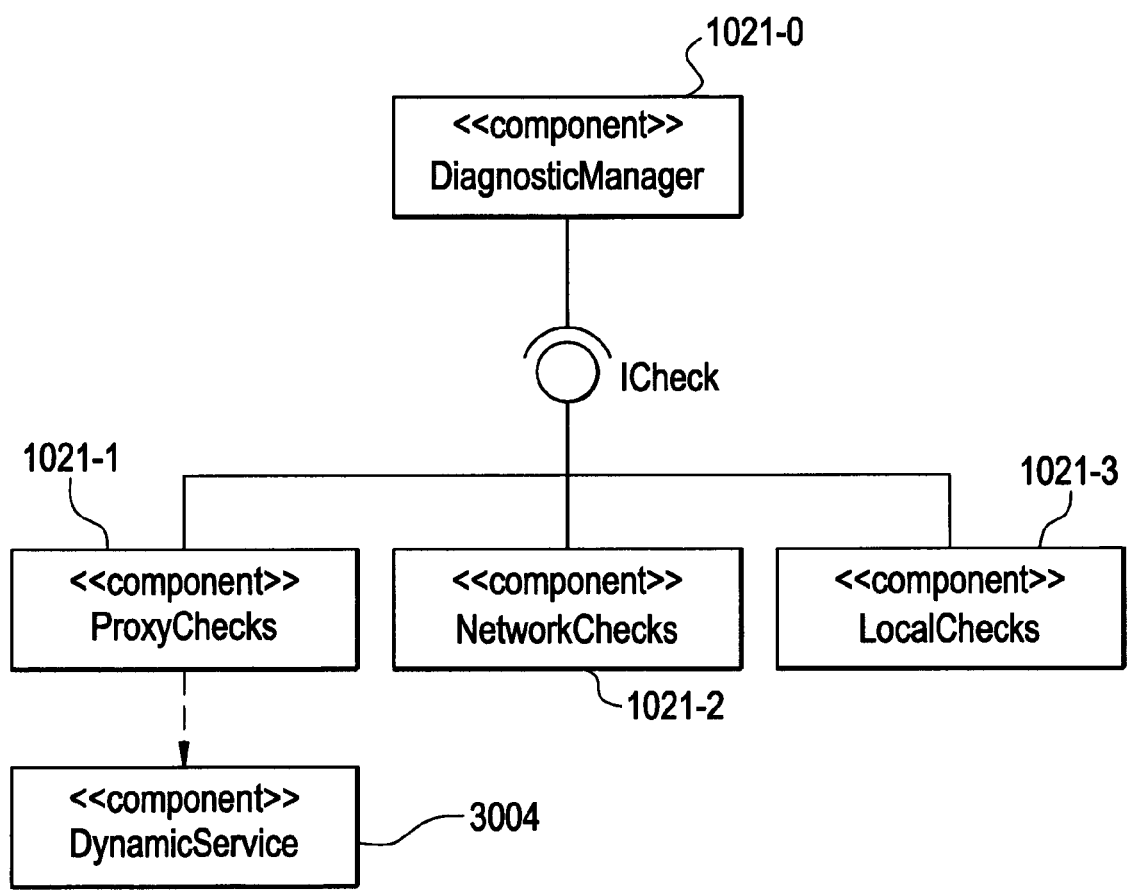
FIG. 22 illustrates an example configuration of the system diagnostic IS unit of FIG. 22.

FIGS. 21 and 22 illustrate an example of a system diagnostics service for monitoring and allowing a clinical user and/or administrator to inspect system behavior. In FIG. 21, the system diagnostic IS unit 1021 communicates with the presentation logic layer 101, business logic layer 103 and/or remote services logic layer 105 of the software application via the interface IDiagnosticManager, which is a simple programming interface or API. Further, the system diagnostic IS unit 1021 communicates with the logging IS unit 1001.

FIG. 22 illustrates an example configuration of the system diagnostics IS unit 1021. Referring to FIG. 22, the system diagnostics IS 1021 includes a diagnostics manager 1021-0, proxy checks 1021-1, network checks 1021-2, and local checks 1021-3. The proxy checks 1021-1, the network checks 1021-2, and the local checks 1021-3 may communicate with the diagnostics manager 1021-0 via the interface ICheck, which is a simple programming interface or API.

Figure 23:
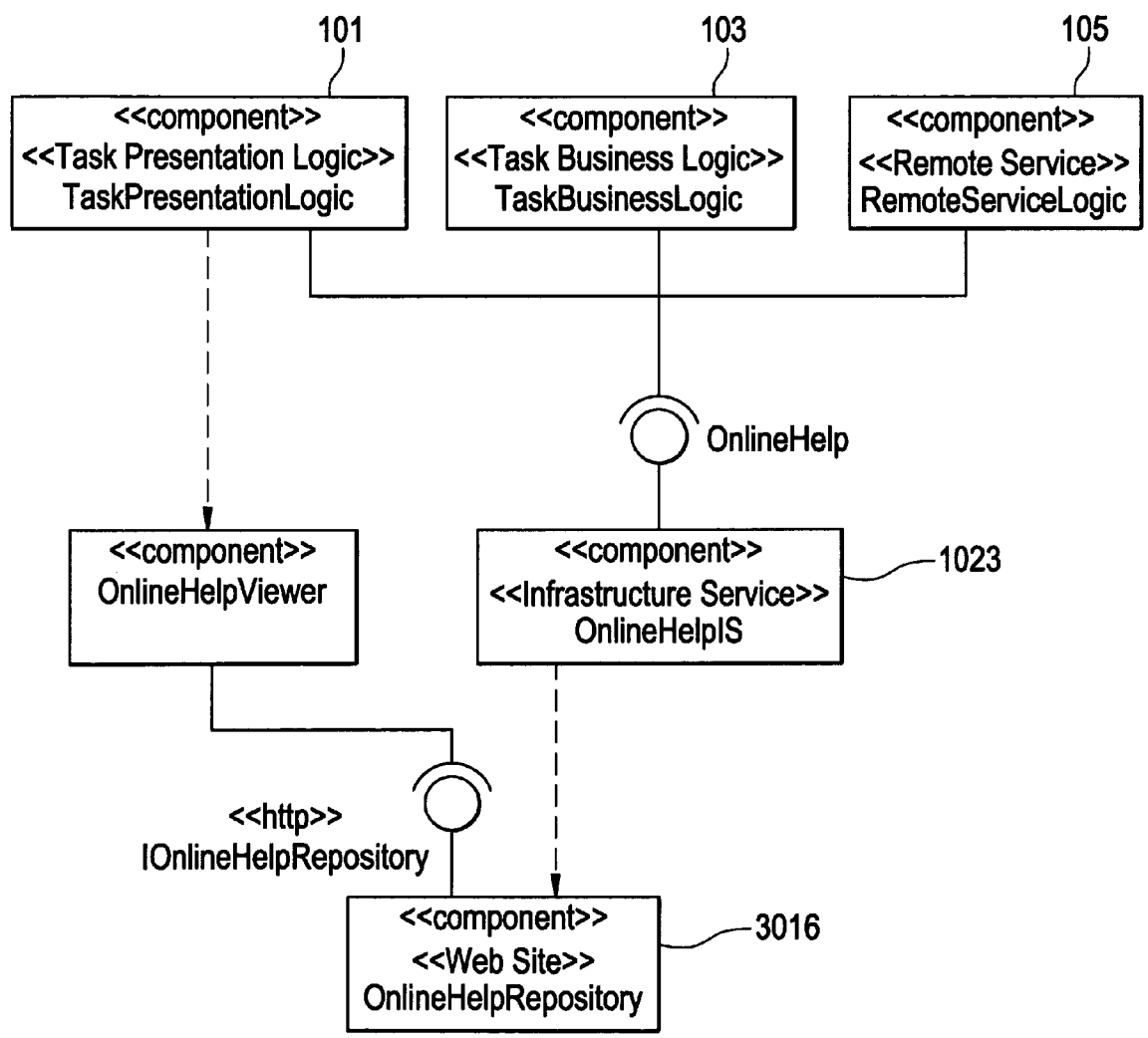
FIG. 23 illustrates an example embodiment for providing help services with an online help IS unit to a software application.
Figure 24:
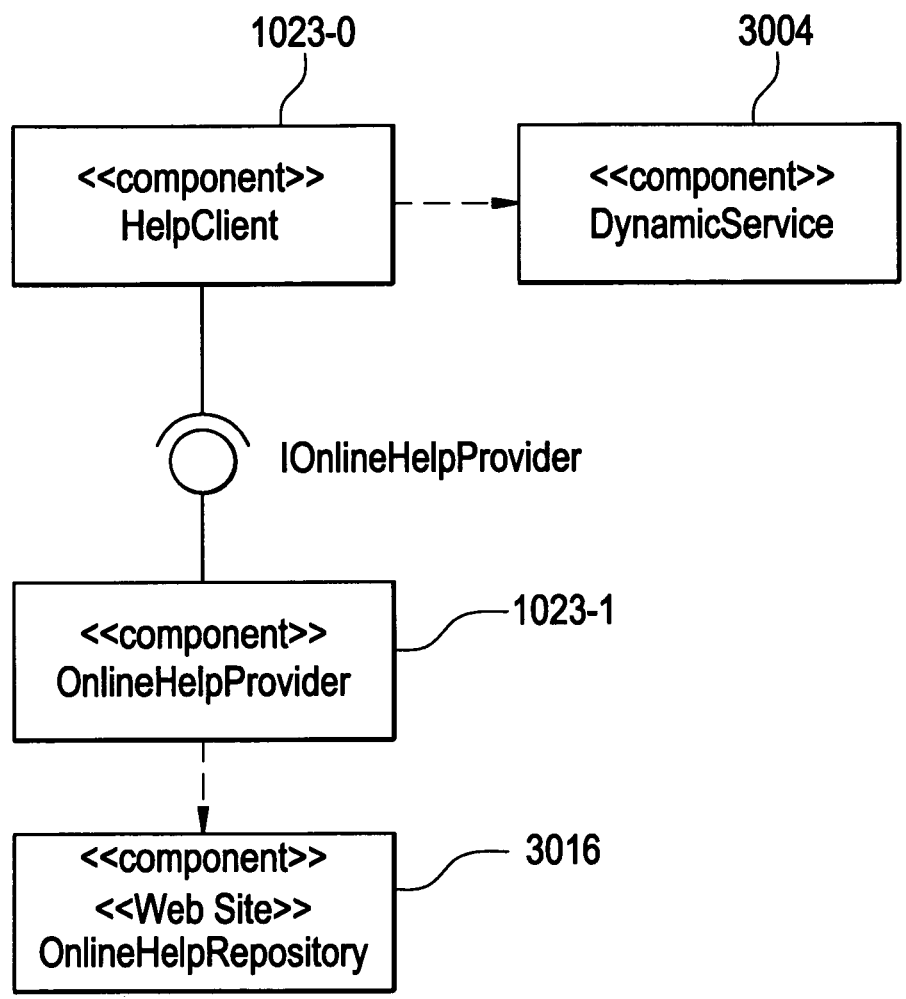
FIG. 24 illustrates an example configuration of the online help IS unit of FIG. 23.

FIGS. 23 and 24 illustrate an example of a help service that may be provided to a software application. In particular, FIG. 23 illustrates an online help IS unit 1021 communicating with the presentation logic layer 101, business logic layer 103 and/or remote service logic layer of a software application via the online help interface OnlineHelp, and an online help repository 3016 of an operational management component 3000 via a remote service interface. The online help IS service unit 1023 offers online help content that may be accessed via a help key and information submitted via a user interface. The online help repository 3016 may be a website provided by a third party.

FIG. 24 indicates that the online help IS unit 1023 may include a help client 1023-0 and online help provider 1023-1. The online help provider 1023-1 allows access to a remote third party help repository, for example, which is accessible via a web service.

Figure 25A:
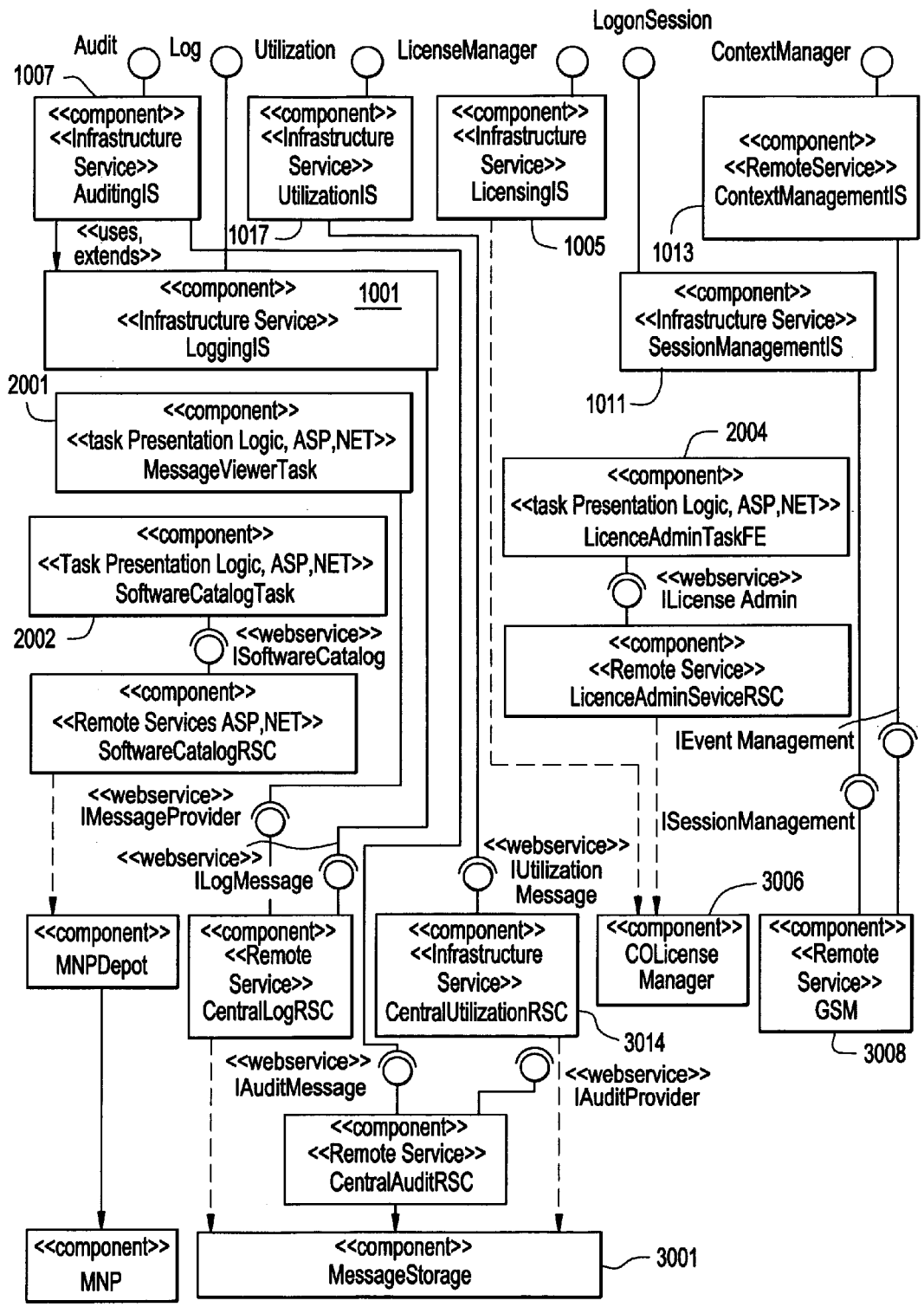
FIGS. 25A and 25B illustrate an example configuration of a subsystem architecture including various local application infrastructure components, IT administration components, and central operational management components.
Figure 25B:
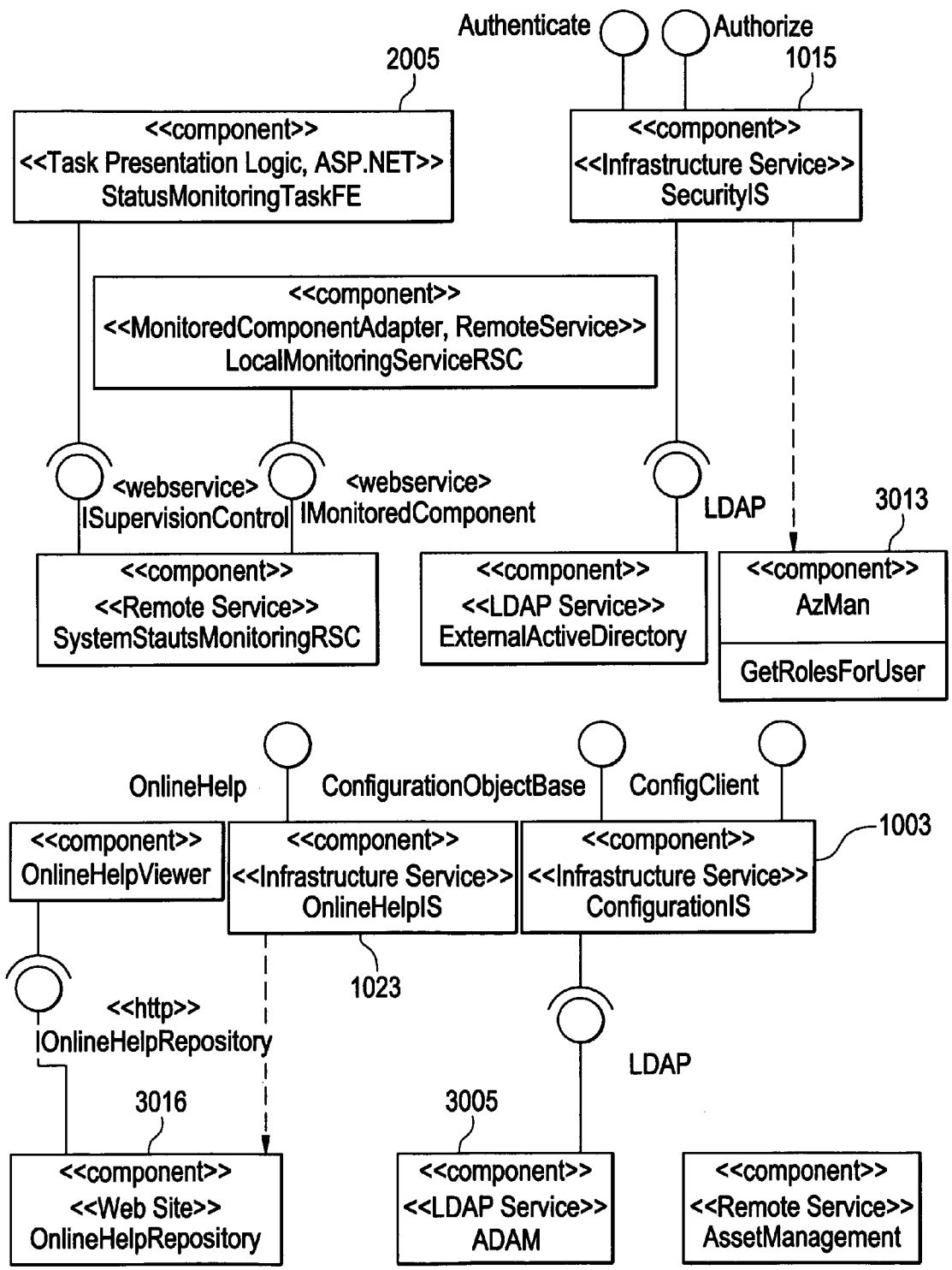

FIGS. 25A and 25B illustrate an example of a sub-architecture system providing IT services to one or more software applications being implemented by a medical and/or financial institution. Referring to FIGS. 25A and 25B, the system includes various components, most of which were previously described with respect to FIGS. 1-23. As such, the description of these individual components will not be repeated herein for the sake of brevity. However, FIGS. 25A and 25 illustrate how various components identified by 100X (X being an integer) of application infrastructure components 1000 may be connected to various components identified as 300X (X being an integer) of an operational management component 3000. In addition, the example embodiment illustrated in FIGS. 25A-25B indicate various components identified as 200X (X being an integer) of a service IT administration component 2000.

While this invention has been particularly shown and described with reference to example embodiments of the present invention, it will be understood by those skilled in the art that various changes in form and details may be made therein without departing from the spirit and scope of the invention.

What is claimed is:

1. A subsystem architecture for providing support services for software applications residing on a first computing device of a system, the subsystem architecture comprising:
   one or more processors and corresponding memories, the memories including computer readable code, that when executed, configure one or more of the processors as,
      a plurality of local infrastructure components, each local infrastructure component configured to provide infrastructure services to a single one of the software applications via first contracts negotiated between the local interface components and the software application;
      a central service component configured to provide centralized services to the software applications via second contracts negotiated between the plurality of local infrastructure components and the central services component, the centralized service component including a memory configured to store centralized information accessible by the plurality of local infrastructure components to assist in the providing of the infrastructure services to the software applications; and
      an administration component configured to exchange and extend different ones of the support services to the software applications independent of the centralized services and the support services provided to other ones of the software applications, wherein
      the administration component is configured to configure the centralized services by adjusting the second contract without affecting the first contract such that the software applications and the local infrastructure components remain coupled while the centralized services are configured,
      each of the local infrastructure components is independent from another of the plurality of local infrastructure components such that the infrastructure services provided by the plurality of local infrastructure components are maintained independently and not connected internally in the first computing device but rather only connectable via a remote interface between the plurality of local infrastructure components and the central service component, and
      each of the provided infrastructure services resides on at least one of the first computing device and a second computing device.

2. The subsystem architecture of claim 1, wherein each local infrastructure component provides a single service tailored for the corresponding software application.

3. The subsystem architecture of claim 1, wherein the services include logging, licensing, auditing, tracing, session management, context management, security, utilization, installation, system diagnostics, local monitoring, online help, and life-cycle management, configuration, and software distribution services.

4. The subsystem architecture of claim 1, wherein each local infrastructure component communicates with the single software application via a contract using a programming language as an interface.

5. The subsystem architecture of claim 1, wherein the central service component provides central services to at least one of the plurality of local infrastructure components, the central service component being independent and unaware of the plurality of local infrastructure components.

6. The subsystem architecture of claim 5, wherein the central services relate to at least one of an active directory application mode, global session management, license management, system status monitoring, message storage, central auditing, central utilization, central logging, authorization managing, authentication management, online help repository, managed node package, and asset management.

7. The subsystem architecture of claim 5, wherein
   each local infrastructure component communicates with the single software application via one of the first contracts using a programming language as an interface; and
   the central service component communicates with the at least one of the plurality of local infrastructure components via one of the second contracts using a web service as an interface.

8. The subsystem architecture of claim 5, wherein a service provided by the at least one of the plurality of local infrastructure components includes an online and offline mode, during the offline mode information related to the service is stored in the one of the plurality of local infrastructure components and during the online mode information related to the service is stored in the central service component.

9. The subsystem architecture of claim 5, wherein at least one of the plurality of local infrastructure components determines a severity of information received from a corresponding software application, and the determined severity determines the processing of the information.

10. The subsystem architecture of claim 9, wherein if the severity of information is determined to be high, the information is stored in the at least one of the local infrastructure components as well as the central service component; and if the severity of information is determined to be low, the information is only stored in the at least one of the local infrastructure components.

11. The subsystem architecture of claim 1, wherein the support services provided by the administrative component include at least one of monitoring and maintaining the plurality of local infrastructure components and wherein the administrative component is independent and unaware of the plurality of local infrastructure components.

12. The subsystem architecture of claim 11, wherein the administrative component receives input from a user, queries an appropriate data repository, receives information based on the query, and displays the queried information.

13. The subsystem architecture of claim 5, wherein the support services provided by the administrative component include at least one of monitoring and maintaining the plurality of local infrastructure components and
the central service component provides central services to at least one of the plurality of local infrastructure components,
wherein the administrative component is independent and unaware of the plurality of local infrastructure components and the central service component.

14. The subsystem architecture of claim 13, wherein the administrative component receives input from a user, queries an appropriate data repository, receives information based on the query, and displays the queried information.

15. The subsystem architecture of claim 1, wherein the software applications include at least one of two dimensional/three dimensional/four dimensional viewing applications for medical scanner devices, patient health monitoring applications, angiographic life monitoring applications, patient registration applications, information systems applications for a hospital department, laboratory, and patient archiving and viewing applications.

16. The subsystem architecture of claim 1, wherein each of the provided infrastructure services includes a plurality of sub-services, and each of the plurality of sub-services resides on one of the first computing device and the second computing device.

17. A method for providing support services for software applications residing on a first computing device of a system, the method comprising:
providing, by the first computing device, a plurality of local infrastructure components via first contracts negotiated between the local interface components and the software application, each local infrastructure component configured to provide infrastructure services to a single one of the software applications;
providing, by a second computing device, a central service component configured to provide centralized services to the software applications via second contracts negotiated between the plurality of local infrastructure components and the central services component, the centralized service component including a memory configured to store centralized information accessible by the plurality of local infrastructure components to assist in the providing of the infrastructure services to the software applications; and
providing, by a third computing device, an administration component configured to exchange and extend different ones of the support services to the software applications independent of the support services provided to other ones of the software applications, wherein
the administration component is configured to configure the centralized services by adjusting the second contract without affecting the first contract such that the software applications and the local infrastructure components remain coupled while the centralized services are configured, and
each of the local infrastructure components is independent from another of the plurality of local infrastructure components such that the infrastructure services provided by the plurality of local infrastructure components are maintained independently and not connected internally in the first computing device but rather only connectable via a remote interface between the plurality of local infrastructure components and the central service component.

18. The method of claim 17, wherein each of the provided infrastructure services resides on at least one of the at least one server and a client computing device.

19. The method of claim 17, further comprising:
communicating, by the at least one server, with the single software application via a contract using a programming language as an interface.

20. The method of claim 17, further comprising:
providing, through a routing device, a central service component to provide central services to at least one of the plurality of local infrastructure components.

* * * * *